(12) United States Patent
Lu

(10) Patent No.: US 10,313,250 B1
(45) Date of Patent: *Jun. 4, 2019

(54) INCREMENTAL AUTOCORRELATION CALCULATION FOR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/964,554

(22) Filed: Dec. 9, 2015

Related U.S. Application Data

(60) Provisional application No. 62/089,261, filed on Dec. 9, 2014.

(51) Int. Cl.
| | | |
|---|---|---|
| G06F 9/46 | (2006.01) | |
| H04L 12/813 | (2013.01) | |
| H04L 29/08 | (2006.01) | |
| G06F 16/955 | (2019.01) | |

(52) U.S. Cl.
CPC ............ H04L 47/20 (2013.01); G06F 16/955 (2019.01); H04L 67/32 (2013.01)

(58) Field of Classification Search
None
See application file for complete search history.

(56) References Cited

U.S. PATENT DOCUMENTS

| | | | |
|---|---|---|---|
| 7,200,580 B1* | 4/2007 | Kovish | G05B 19/408 706/12 |
| 7,747,413 B2 | 6/2010 | Ramsey et al. | |
| 7,840,377 B2 | 11/2010 | Ramsey et al. | |
| 9,069,726 B2 | 6/2015 | Lu | |
| 2007/0116158 A1* | 5/2007 | Guo | H04L 27/0014 375/343 |
| 2008/0239342 A1* | 10/2008 | Lieberman | H04N 1/40075 358/1.9 |
| 2008/0297513 A1* | 12/2008 | Greenhill | G06Q 99/00 345/440 |
| 2009/0164224 A1* | 6/2009 | Fejzo | G10L 19/0017 704/500 |

(Continued)

FOREIGN PATENT DOCUMENTS

| | | |
|---|---|---|
| WO | WO-2014093540 A2 | 6/2014 |
| WO | WO-2014093540 A3 | 9/2014 |

*Primary Examiner* — Dong U Kim

(57) ABSTRACT

The present invention extends to methods, systems, and computing system program products for incrementally calculating autocorrelation for streamed data in real time. Embodiments of the invention include incrementally calculating one or more components of autocorrelation at a specified lag for an adjusted computation window based on the one or more components of the autocorrelation at the specified lag calculated for a previous computation window and then calculating the autocorrelation the specified lag using the components. Incrementally calculating autocorrelation avoids visiting and storing all data elements in the adjusted computation window and performing redundant computations thereby increasing calculation efficiency, saving computing resources and reducing computing system's power consumption.

20 Claims, 27 Drawing Sheets

(56) References Cited

U.S. PATENT DOCUMENTS

| | | | | |
|---|---|---|---|---|
| 2010/0063805 | A1* | 3/2010 | Bruhn | G10L 19/26 704/207 |
| 2010/0204967 | A1* | 8/2010 | Mun | G06Q 10/04 703/2 |
| 2011/0302112 | A1* | 12/2011 | Shan | G06Q 10/067 706/12 |
| 2014/0164456 | A1* | 6/2014 | Lu | H04L 65/60 708/200 |
| 2014/0358265 | A1* | 12/2014 | Wang | G10H 1/40 700/94 |
| 2015/0088606 | A1* | 3/2015 | Tyagi | G06Q 30/0202 705/7.31 |

\* cited by examiner

The Definition of Autocorrelation:

Streamed Big Data or Time Series Data    Computation Window

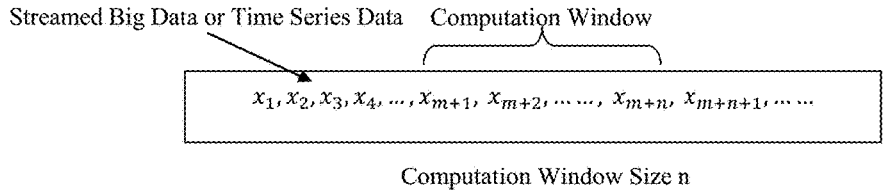

Computation Window Size n

Suppose we have a streamed Big data or time series data: at time point $m+1$ we get data $x_{m+1}$, and at time point $m+n$ we get data $x_{m+n}$, ..... .

Define a computation window as a window on the streamed or time series data which contains the data elements to be involved in autocorrelation calculation. Suppose we have a computation window $X$ composed of $n$ data elements: $X = \{x_i | i = m + 1, m + 2, ......, m + n\}$ which is a window on a streamed Big Data or time series data. We want to calculate the autocorrelation within the computation window whenever an old data is added to the computation window.

Suppose $X$ has changed after some time period, say a new data element $x_a$ is added to computation window $X$. Whenever a data element is added, the computation window is considered as a new computation window. A new iteration of calculation is started each time an autocorrelation is recalculated due to a data change in the computation window.

Define the sum of the computation window $X$ with size $n$ in the $k^{th}$ iteration as below:

$S_k = x_{m+1} + x_{m+2} + x_{m+3} + \cdots + x_{m+n} = \sum_{m+1}^{m+n} x_i$   401

Define the mean of the computation window $X$ with size $n$ in the $k^{th}$ iteration as below:

$\bar{x}_k = \frac{(x_{m+1}+x_{m+2}+x_{m+3}+\cdots+x_{m+n})}{n} = \frac{\sum_{m+1}^{m+n} x_i}{n}$   402

Assume $l$ is the lag, then the autocorrelation in the computation window $X$ with size $n$ is defined as $\rho_{(k,l)}$ where the subscription $k$ denotes the order of iteration:

$\rho_{(k,l)} = \frac{\sum_{m+1+l}^{m+n}(x_i-\bar{x}_k)(x_{i-l}-\bar{x}_k)}{\sum_{m+1}^{m+n}(x_i-\bar{x}_k)^2}$   403

Now, suppose we have already calculated $\rho_{(k,l)}$, and we want to calculate the autocorrelation of the computation window $X$ again after a new data element $x_a$ has been added to $X$.

Define the sum of the updated $X$ with size $n + 1$ in the $k+1^{th}$ iteration as below:

$S_{k+1} = x_{m+1} + x_{m+2} + x_{m+3} + \cdots + x_{m+n} + x_a = \sum_{m+1}^{m+n} x_i + x_a$   404

Define the mean of the updated $X$ with size $n + 1$ in the $k+1^{th}$ iteration as below:

$\bar{x}_{k+1} = \frac{(x_{m+1}+x_{m+2}+x_{m+3}+\cdots+x_{m+n}+x_a)}{n+1} = \frac{\sum_{m+1}^{m+n} x_i + x_a}{n+1}$   405

Fig. 4A

The Definition of Autocorrelation (cont'd):

The computing results of an autocorrelation is related to not only the value of each data element in the computation window but also the sequential order of each data element, so it should be handled differently when adding a data element to different positions within the computation window.

There are three different cases:

1. adding a new data element $x_a$ to the left most position of the computation widnow;
2. adding a new data element $x_a$ to the right most position of the computation window;
3. adding a new data element $x_a$ to any position within the computation window but not at either end.

The 3$^{rd}$ case rarely happens in time series data, so let's take the first two cases into consideration.

Define the autocorrelation of the updated $X^I$ with size $n + 1$ after adding a new data element $x_a$ to the left most position of the computation window in the k+1$^{th}$ iteration as ($a = m$):

$$\rho^I_{(k+1,l)} = \frac{\sum_{m+1+l}^{m+n}(x_i-\bar{x}_{k+1})(x_{i-l}-\bar{x}_{k+1})+(x_a-\bar{x}_{k+1})(x_{a+l}-\bar{x}_{k+1})}{\sum_{m+1}^{m+n}(x_i-\bar{x}_{k+1})^2+(x_a-\bar{x}_{k+1})^2} \qquad 406$$

Define the autocorrelation of the updated $X^{II}$ with size $n + 1$ after adding a new data element $x_a$ to the right most position of the computation window in the k+1$^{th}$ iteration as ($a = m + n + 1$):

$$\rho^{II}_{(k+1,l)} = \frac{\sum_{m+1+l}^{m+n}(x_i-\bar{x}_{k+1})(x_{i-l}-\bar{x}_{k+1})+(x_a-\bar{x}_{k+1})(x_{a-l}-\bar{x}_{k+1})}{\sum_{m+1}^{m+n}(x_i-\bar{x}_{k+1})^2+(x_a-\bar{x}_{k+1})^2} \qquad 407$$

Fig. 4A Cont'd

Some Example Components of an Autocorrelation:

- $S_k = \sum_1^n x_i$
- $\bar{x}_k = \frac{1}{n}\sum_1^n x_i$
- $SS_k = \sum_1^n x_i^2$
- $SX_k = \sum_1^n (x_i - \bar{x}_k)^2$
- $covX_{(k,l)} = \sum_{1+l}^n (x_i - \bar{x}_k)(x_{i-l} - \bar{x}_k)$     ($l$ is the lag)

The sum or mean of the data elements in the data set will be used by following incremental algorithms, so we put the equation here instead of in each incremental algorithms.

$S_{k+1}$ defined in equation 404 can be calculated in an incremental way by using $S_k$ defined in equation 401:

$S_{k+1} = S_k + x_a$    408

$\bar{x}_{k+1}$ defined in equation 405 can be calculated in an incremental way by using $\bar{x}_k$ defined in equation 402:

$\bar{x}_{k+1} = \frac{n\bar{x}_k + x_a}{n+1}$    409

Fig. 4B

Incremental Algorithm 1:

$$SS_k = \sum_{m+1}^{m+n} x_i^2 \qquad \sim\!\!\_410$$

$$SS_{k+1} = \sum_{m+1}^{m+n} x_i^2 + x_a^2 \qquad \sim\!\!\_411$$

$SS_{k+1}$ can be calculated in an incremental way:

$$SS_{k+1} = SS_k + x_a^2 \qquad \sim\!\!\_412$$

$$SX_k = \sum_{m+1}^{m+n}(x_i - \bar{x}_k)^2 \qquad \sim\!\!\_413$$

$$SX_{k+1} = \sum_{m+1}^{m+n}(x_i - \bar{x}_{k+1})^2 + (x_a - \bar{x}_{k+1})^2 \qquad \sim\!\!\_414$$

$SX_{k+1}$ can be calculated by using $SS_{k+1}$ and $S_{k+1}$ or $\bar{x}_{k+1}$:

$$SX_{k+1} = SS_{k+1} - \bar{x}_{k+1} S_{k+1} = SS_{k+1} - S_{k+1}^2/(n+1) = SS_{k+1} - (n+1)\bar{x}_{k+1}^2 \qquad \sim\!\!\_415$$

$$covX_{(k,l)} = \sum_{m+1+l}^{m+n}(x_i - \bar{x}_k)(x_{i-l} - \bar{x}_k) \qquad \sim\!\!\_416$$

$$covX^I{}_{(k+1,l)} = \sum_{m+1+l}^{m+n}(x_i - \bar{x}_{k+1})(x_{i-l} - \bar{x}_{k+1}) + (x_a - \bar{x}_{k+1})(x_{a+l} - \bar{x}_{k+1}) \qquad \sim\!\!\_417$$

$covX^I{}_{(k+1,l)}$ can be calculated in an incremental way using $S_k$ or $\bar{x}_k$ and $S_{k+1}$ or $\bar{x}_{k+1}$:

$$covX^I{}_{(k+1,l)} = covX_{(k,l)} + (x_a - S_{k+1}/(n+1))(x_{a+l} - S_{k+1}/(n+1)) + (S_{k+1}/(n+1) - S_k/n)(\sum_{m+1}^{m+l} x_i + \sum_{m+n+1-l}^{m+n} x_i + (n-l)S_{k+1}/(n+1) - (n+l)S_k/n) = covX_{(k,l)} + (x_a - \bar{x}_{k+1})(x_{a+l} - \bar{x}_{k+1}) + (\bar{x}_{k+1} - \bar{x}_k)(\sum_{m+1}^{m+l} x_i + \sum_{m+n+1-l}^{m+n} x_i + (n-l)\bar{x}_{k+1} - (n+l)\bar{x}_k) \qquad \sim\!\!\_418$$

The autocorrelation defined in equation 406 at lag $l$ can be calculated by using $covX^I{}_{(k+1,l)}$ calculated in equation 418 and $SX_{k+1}$ calculated in equation 415

$$\rho^I{}_{(k+1,l)} = \frac{covX^I{}_{(k+1,l)}}{SX_{k+1}} \qquad \sim\!\!\_419$$

$$covX^{II}{}_{(k+1,l)} = \sum_{m+1+l}^{m+n}(x_i - \bar{x}_{k+1})(x_{i-l} - \bar{x}_{k+1}) + (x_a - \bar{x}_{k+1})(x_{a-l} - \bar{x}_{k+1}) \qquad \sim\!\!\_420$$

$covX^{II}{}_{(k+1,l)}$ can be calculated in an incremental way using $S_k$ or $\bar{x}_k$ and $S_{k+1}$ or $\bar{x}_{k+1}$:

$$covX^{II}{}_{(k+1,l)} = covX_{(k,l)} + (x_a - S_{k+1}/(n+1))(x_{a-l} - S_{k+1}/(n+1)) + (S_{k+1}/(n+1) - S_k/n)(\sum_{m+1}^{m+l} x_i + \sum_{m+n+1-l}^{m+n} x_i + (n-l)S_{k+1}/(n+1) - (n+l)S_k/n) = covX_{(k,l)} + (x_a - \bar{x}_{k+1})(x_{a-l} - \bar{x}_{k+1}) + (\bar{x}_{k+1} - \bar{x}_k)(\sum_{m+1}^{m+l} x_i + \sum_{m+n+1-l}^{m+n} x_i + (n-l)\bar{x}_{k+1} - (n+l)\bar{x}_k) \qquad \sim\!\!\_421$$

The autocorrelation defined in equation 407 at lag $l$ can be calculated by using $covX^{II}{}_{(k+1,l)}$ calculated in equation 421 and $SX_{k+1}$ calculated in equation 415

$$\rho^{II}{}_{(k+1,l)} = \frac{covX^{II}{}_{(k+1,l)}}{SX_{k+1}} \qquad \sim\!\!\_422$$

Fig. 4C

Incremental Algorithm 2:

$SX_k = \sum_{m+1}^{m+n}(x_i - \bar{x}_k)^2$ ⌒⌓423

$SX_{k+1} = \sum_{m+1}^{m+n}(x_i - \bar{x}_{k+1})^2 + (x_a - \bar{x}_{k+1})^2$ ⌒⌓424

$SX_{k+1}$ can be calculated in an incremental way using $S_k$ or $\bar{x}_k$ and $S_{k+1}$ or $\bar{x}_{k+1}$:

$SX_{k+1} = SX_k + (x_a - S_{k+1}/(n+1))(x_a - S_k/n) = SX_k + (x_a - \bar{x}_{k+1})(x_a - \bar{x}_k)$ ⌒⌓425

$covX_{(k,l)} = \sum_{m+1+l}^{m+n}(x_i - \bar{x}_k)(x_{i-l} - \bar{x}_k)$ ⌒⌓426

$covX^I{}_{(k+1,l)} = \sum_{m+1+l}^{m+n}(x_i - \bar{x}_{k+1})(x_{i-l} - \bar{x}_{k+1}) + (x_a - \bar{x}_{k+1})(x_{a+l} - \bar{x}_{k+1})$ ⌒⌓427

$covX^I{}_{(k+1,l)}$ can be calculated in an incremental way using $S_k$ or $\bar{x}_k$ and $S_{k+1}$ or $\bar{x}_{k+1}$:

$covX^I{}_{(k+1,l)} = covX_{(k,l)} + (x_a - S_{k+1}/(n+1))(x_{a+l} - S_{k+1}/(n+1)) + (S_{k+1}/(n+1) - S_k/n)(\sum_{m+1}^{m+l} x_i + \sum_{m+1+n-l}^{m+n} x_i + (n-l)S_{k+1}/(n+1) - (n+l)S_k/n) = covX_{(k,l)} + (x_a - \bar{x}_{k+1})(x_{a+l} - \bar{x}_{k+1}) + (\bar{x}_{k+1} - \bar{x}_k)(\sum_{m+1}^{m+l} x_i + \sum_{m+1+n-l}^{m+n} x_i + (n-l)\bar{x}_{k+1} - (n+l)\bar{x}_k)$ ⌒⌓428

The autocorrelation defined in equation 406 at lag $l$ can be calculated by using $covX^I{}_{(k+1,l)}$ calculated in equation 428 and $SX_{k+1}$ calculated in equation 425

$\rho^I{}_{(k+1,l)} = \frac{covX^I{}_{(k+1,l)}}{SX_{k+1}}$ ⌒⌓429

$covX^{II}{}_{(k+1,l)} = \sum_{m+1+l}^{m+n}(x_i - \bar{x}_{k+1})(x_{i-l} - \bar{x}_{k+1}) + (x_a - \bar{x}_{k+1})(x_{a-l} - \bar{x}_{k+1})$ ⌒⌓430

$covX^{II}{}_{(k+1,l)}$ can be calculated in an incremental way using $S_k$ or $\bar{x}_k$ and $S_{k+1}$ or $\bar{x}_{k+1}$:

$covX^{II}{}_{(k+1,l)} = covX_{(k,l)} + (x_a - S_{k+1}/(n+1))(x_{a-l} - S_{k+1}/(n+1)) + (S_{k+1}/(n+1) - S_k/n)(\sum_{m+1}^{m+l} x_i + \sum_{m+1+n-l}^{m+n} x_i + (n-l)S_{k+1}/(n+1) - (n+l)S_k/n) = covX_{(k,l)} + (x_a - \bar{x}_{k+1})(x_{a-l} - \bar{x}_{k+1}) + (\bar{x}_{k+1} - \bar{x}_k)(\sum_{m+1}^{m+l} x_i + \sum_{m+1+n-l}^{m+n} x_i + (n-l)\bar{x}_{k+1} - (n+l)\bar{x}_k)$ ⌒⌓431

The autocorrelation defined in equation 407 at lag $l$ can be calculated by using $covX^{II}{}_{(k+1,l)}$ calculated in equation 431 and $SX_{k+1}$ calculated in equation 425

$\rho^{II}{}_{(k+1,l)} = \frac{covX^{II}{}_{(k+1,l)}}{SX_{k+1}}$ ⌒⌓432

Fig. 4D

Incremental Algorithm 3:

$SX_k = \sum_{m+1}^{m+n}(x_i - \bar{x}_k)^2$ ⌒‿433

$SX_{k+1} = \sum_{m+1}^{m+n}(x_i - \bar{x}_{k+1})^2 + (x_a - \bar{x}_{k+1})^2$ ⌒‿434

$SX_{k+1}$ can be calculated in an incremental way using $S_k$ or $\bar{x}_k$ and $S_{k+1}$ or $\bar{x}_{k+1}$:

$SX_{k+1} = SX_k + (x_a - S_{k+1}/(n+1))(x_a - S_k/n) = SX_k + (x_a - \bar{x}_{k+1})(x_a - \bar{x}_k)$ ⌒‿435

$covX_{(k,l)} = \sum_{m+1+l}^{m+n}(x_i - \bar{x}_k)(x_{i-l} - \bar{x}_k)$ ⌒‿436

$covX^I_{(k+1,l)} = \sum_{m+1+l}^{m+n}(x_i - \bar{x}_{k+1})(x_{i-l} - \bar{x}_{k+1}) + (x_a - \bar{x}_{k+1})(x_{a+l} - \bar{x}_{k+1})$ ⌒‿437

$covX^I_{(k+1,l)}$ can be calculated in an incremental way:

$covX^I_{(k+1,l)} = covX_{(k,l)} + (x_a - S_{k+1}/(n+1))(x_{a+l} - S_{k+1}/(n+1)) + (S_{k+1}/(n+1) - S_k/n)(\sum_{m+1}^{m+l} x_i + \sum_{m+1+n-l}^{m+n} x_i + x_a - S_{k+1}/(n+1) - l(S_k/n + S_{k+1}/(n+1))) = covX_{(k,l)} + (x_a - \bar{x}_{k+1})(x_{a+l} - \bar{x}_{k+1}) + (\bar{x}_{k+1} - \bar{x}_k)(\sum_{m+1}^{m+l} x_i + \sum_{m+1+n-l}^{m+n} x_i + x_a - \bar{x}_{k+1} - l(\bar{x}_k + \bar{x}_{k+1}))$

⌒‿438

The autocorrelation defined in equation 406 at lag $l$ can be calculated by using $covX^I_{(k+1,l)}$ calculated in equation 438 and $SX_{k+1}$ calculated in equation 435

$\rho^l_{(k+1,l)} = \frac{covX^I_{(k+1,l)}}{SX_{k+1}}$ ⌒‿439

$covX^{II}_{(k+1,l)} = \sum_{1+l}^{n}(x_i - \bar{x}_{k+1})(x_{i-l} - \bar{x}_{k+1}) + (x_a - \bar{x}_{k+1})(x_{a-l} - \bar{x}_{k+1})$ ⌒‿440

$covX^{II}_{(k+1,l)}$ can be calculated in an incremental way:

$covX^{II}_{(k+1,l)} = covX_{(k,l)} + (x_a - S_{k+1}/(n+1))(x_{a-l} - S_{k+1}/(n+1)) + (S_{k+1}/(n+1) - S_k/n)(\sum_{m+1}^{m+l} x_i + \sum_{m+1+n-l}^{m+n} x_i + x_a - S_{k+1}/(n+1) - l(S_k/n + S_{k+1}/(n+1))) = covX_{(k,l)} + (x_a - \bar{x}_{k+1})(x_{a-l} - \bar{x}_{k+1}) + (\bar{x}_{k+1} - \bar{x}_k)(\sum_{m+1}^{m+l} x_i + \sum_{m+1+n-l}^{m+n} x_i + x_a - \bar{x}_{k+1} - l(\bar{x}_k + \bar{x}_{k+1}))$

⌒‿441

The autocorrelation defined in equation 407 at lag $l$ can be calculated by using $covX^{II}_{(k+1,l)}$ calculated in equation 441 and $SX_{k+1}$ calculated in equation 435

$\rho^{II}_{(k+1,l)} = \frac{covX^{II}_{(k+1,l)}}{SX_{k+1}}$ ⌒‿442

Fig. 4E

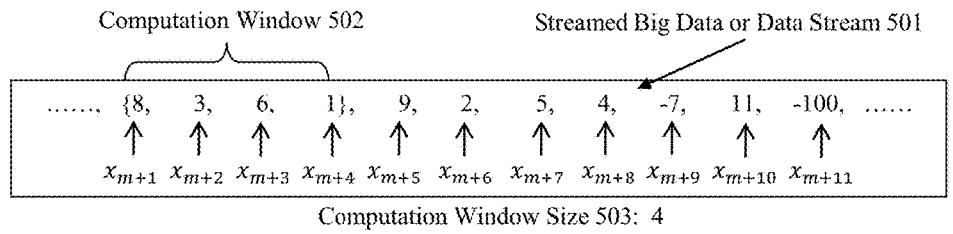

Computation Window Size 503: 4

Calculate Autocorrelation at lag 1 for Computation Window 502

1. Calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Calculate $\sum_{m+1}^{m+4}(x_i - \bar{x}_1)^2$ for the 1st iteration:

$$\sum_{m+1}^{m+4}(x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

3. Calculate $\sum_{m+1+1}^{m+4}(x_i - \bar{x}_1)(x_{i-1} - \bar{x}_1)$ for the 1st iteration:

$$\sum_{m+1+1}^{m+4}(x_i - \bar{x}_1)(x_{i-1} - \bar{x}_1) = (3 - 4.5)(8 - 4.5) + (6 - 4.5)(3 - 4.5) + (1 - 4.5)(6 - 4.5) = -12.75$$

Operations in this step: 3 multiplications, 2 additions, 6 subtractions

4. Calculate the autocorrelation $\rho_{(1,1)}$ for the 1st iteration:

$$\rho_{(1,1)} = \frac{\sum_{m+1+1}^{m+4}(x_i - \bar{x}_1)(x_{i-1} - \bar{x}_1)}{\sum_{m+1}^{m+4}(x_i - \bar{x}_1)^2} = \frac{-12.75}{29} = -0.4396551724137931$$

Operations in this step: 1 division

There are a total of 2 divisions, 7 multiplications, 8 additions and 10 subtractions when calculating the autocorrelation at lag $l = 1$ on a computation window of size 4 without any optimization.

Fig. 5A

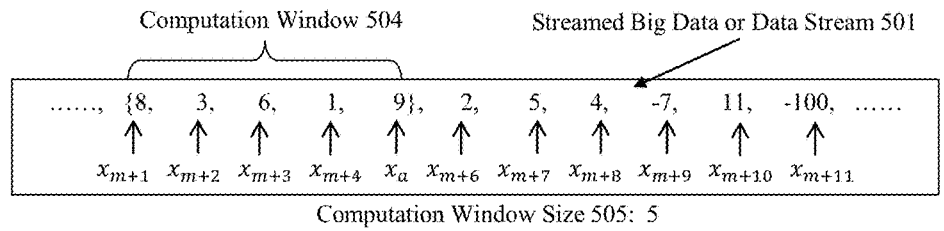

Computation Window Size 505: 5

Calculate Autocorrelation at lag 1 for Computation Window 504

1. Calculate $\bar{x}_2$ for the $2^{nd}$ iteration:

$$\bar{x}_2 = \frac{8+3+6+1+9}{5} = \frac{27}{5} = 5.4$$

Operations in this step: 1 division, 4 additions

2. Calculate $\sum_{m+1}^{m+4}(x_i - \bar{x}_2)^2 + (x_a - \bar{x}_2)^2$ for the $2^{nd}$ iteration:

$\sum_{m+1}^{m+4}(x_i - \bar{x}_2)^2 + (x_a - \bar{x}_2)^2 = (8-5.4)^2 + (3-5.4)^2 + (6-5.4)^2 + (1-5.4)^2 + (9-5.4)^2 = 45.2$ Operations in this step: 5 multiplications, 4 additions, 5 subtractions 3. Calculate $\sum_{m+1+1}^{m+4}(x_i - \bar{x}_2)(x_{i-1} - \bar{x}_2) + (x_a - \bar{x}_2)(x_{4+1-1} - \bar{x}_2)$ for the $2^{nd}$ iteration:

$\sum_{m+1+1}^{m+4}(x_i - \bar{x}_2)(x_{i-1} - \bar{x}_2) + (x_a - \bar{x}_2)(x_{4+1-1} - \bar{x}_2) = (3-5.4)(8-5.4) + (6-5.4)(3-5.4) + (1-5.4)(6-5.4) + (9-5.4)(1-5.4) = (-2.4)(2.6) + (0.6)(-2.4) + (-4.4)(0.6) + (3.6)(-4.4) = -6.24 - 1.44 - 2.64 - 15.84 = -26.16$ Operations in this step: 4 multiplications, 3 additions, 8 subtractions 4. Calculate the autocorrelation $\rho_{(2,1)}$ for the $2^{nd}$ iteration:

$$\rho_{(2,1)} = \frac{\sum_{m+1+1}^{m+4}(x_i - \bar{x}_2)(x_{i-1} - \bar{x}_2) + (x_a - \bar{x}_2)(x_{4+1-1} - \bar{x}_2)}{\sum_{m+1}^{m+4}(x_i - \bar{x}_2)^2 + (x_a - \bar{x}_2)^2} = \frac{-26.16}{45.2} = -0.5787610619469027$$

Operations in this step: 1 division

There are a total of 2 divisions, 9 multiplications, 11 additions and 13 subtractions when calculating the autocorrelation at lag $l = 1$ on a computation window of size 5 without any optimization.

Fig. 5A Cont'd 1

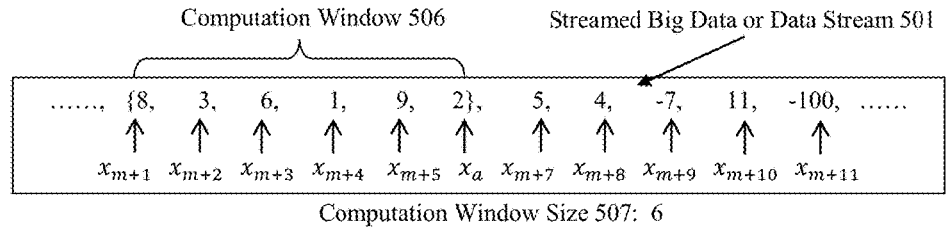

Computation Window Size 507: 6

<u>Calculate Autocorrelation at lag 1 for Computation Window 506</u>

1. Calculate $\bar{x}_3$ for the 3$^{rd}$ iteration:

$$\bar{x}_3 = \frac{8+3+6+1+9+2}{6} = \frac{29}{6} = 4.8333333333333333$$

Operations in this step: 1 division, 5 additions

2. Calculate $\sum_{m+1}^{m+5}(x_i - \bar{x}_3)^2 + (x_a - \bar{x}_3)^2$ for the 3$^{rd}$ iteration:

$$\sum_{m+1}^{m+5}(x_i - \bar{x}_3)^2 + (x_a - \bar{x}_3)^2 = 54.8333333333333333$$

Operations in this step: 6 multiplications, 5 additions, 6 subtractions

3. Calculate $\sum_{m+1+1}^{m+5}(x_i - \bar{x}_3)(x_{i-1} - \bar{x}_3) + (x_a - \bar{x}_3)(x_{5+1-1} - \bar{x}_3)$ for the 3$^{rd}$ iteration:

$$\sum_{m+1+1}^{m+5}(x_i - \bar{x}_3)(x_{i-1} - \bar{x}_3) + (x_a - \bar{x}_3)(x_{5+1-1} - \bar{x}_3) = -40.1944444444444444$$

Operations in this step: 5 multiplications, 4 additions, 10 subtractions

4. Calculate the autocorrelation $\rho_{(3,1)}$ for the 3$^{rd}$ iteration:

$$\rho_{(3,1)} = \frac{\sum_{m+1+1}^{m+5}(x_i - \bar{x}_3)(x_{i-1} - \bar{x}_3) + (x_a - \bar{x}_3)(x_{5+1-1} - \bar{x}_3)}{\sum_{m+1}^{m+5}(x_i - \bar{x}_3)^2 + (x_a - \bar{x}_3)^2} = \frac{-40.1944444444444444}{54.8333333333333334} = -0.7330293819655522$$

Operations in this step: 1 division

There are a total of 2 divisions, 11 multiplications, 14 additions and 16 subtractions when calculating the autocorrelation at lag $l = 1$ on a computation window of size 6 without any optimization.

Traditional algorithms for calculating autocorrelation on $n$ data elements at a given lag $l$ will typically totally take 2 divisions, $2n - l$ multiplications, $3n - (l + 3)$ additions, and $3n - 2l$ subtractions without any optimization.

Fig. 5A Cont'd 2

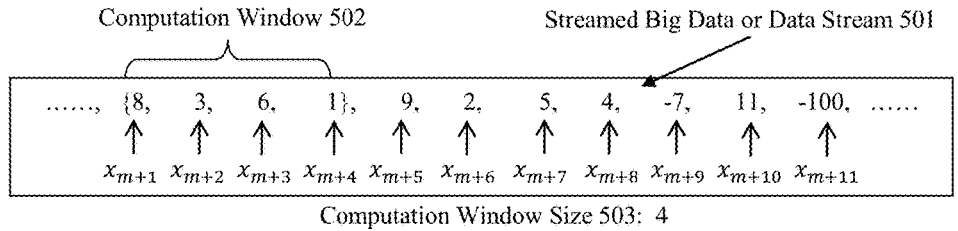

Computation Window Size 503: 4

Calculate Autocorrelation at lag 1 for Computation Window 502

Incremental Algorithm 1:

1. Calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Use equation 410 to calculate $SS_1$ and use equation 413 to calculate $SX_1$ for the 1st iteration:

$$SS_1 = \sum_{m+1}^{m+4} x_i^2 = 8^2 + 3^2 + 6^2 + 1^2 = 64 + 9 + 36 + 1 = 110$$

$$SX_1 = SS_1 - 4\bar{x}_1^2 = 110 - 4 \times 4.5^2 = 110 - 4 \times 4.5^2 = 110 - 4 \times 20.25 = 110 - 81 = 29$$

Operations in this step: 6 multiplications, 3 additions, 1 subtraction

3. Use equation 416 to calculate $covX_{(1,1)}$ for the 1st iteration:

$$covX_{(1,1)} = \sum_{m+1+1}^{m+4}(x_i - \bar{x}_1)(x_{i-1} - \bar{x}_1) = -12.75$$

Operations in this step: 3 multiplications, 2 additions, 6 subtractions

4. Use equation 403 to calculate the autocorrelation $\rho_{(1,1)}$ for the 1st iteration:

$$\rho_{(1,1)} = \frac{\sum_{m+1+1}^{m+4}(x_i - \bar{x}_1)(x_{i-1} - \bar{x}_1)}{\sum_{m+1}^{m+4}(x_i - \bar{x}_1)^2} = \frac{covX_{(1,1)}}{SX_1} = \frac{-12.75}{29} = -0.4396551724137931$$

Operations in this step: 1 division

There are a total of 2 divisions, 9 multiplications, 8 additions and 7 subtractions when calculating the autocorrelation with lag $l = 1$ on a computation window of size 4.

Fig. 5B

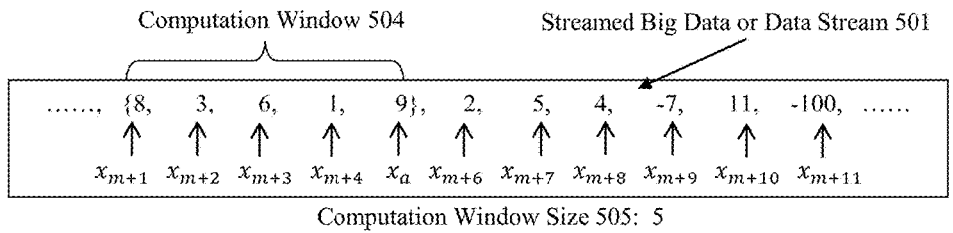

Computation Window Size 505: 5

Calculate Autocorrelation at lag 1 for Computation Window 504

Incremental Algorithm 1:

1. Use equation 409 to incrementally calculate $\bar{x}_2$ for the 2$^{nd}$ iteration:

$$\bar{x}_2 = \frac{4\bar{x}_1 + x_a}{4+1} = \frac{4 \times 4.5 + 9}{5} = \frac{27}{5} = 5.4 \quad \text{(keep 4+1)}$$

Operations in this step: 1 division, 1 multiplication, 2 additions

2. Use equation 412 to incrementally calculate $SS_2$ and equation 415 to incrementally calculate $SX_2$ $$SS_2 = SS_1 + x_a^2 = 110 + 9^2 = 110 + 81 = 191$$

$$SX_2 = SS_2 - (4+1)\bar{x}_2^2 = 191 - 5 \times 5.4^2 = 191 - 145.8 = 45.2$$

Operations in this step: 3 multiplications, 1 addition, 1 subtraction (use 4+1 calculated in step 1)

3. Use equation 421 to incrementally calculate $covX^{II}_{(2,1)}$ with $n = 4, l = 1$ for the 2$^{nd}$ iteration:

$covX^{II}_{(2,1)} = covX_{(1,1)} + (x_a - \bar{x}_2)(x_{4+1-1} - \bar{x}_2) + (\bar{x}_2 - \bar{x}_1)(\sum_{m+1}^{m+1} x_i + \sum_{m+4+1-1}^{m+4} x_i + (4-1)\bar{x}_2 - (4+1)\bar{x}_1) = -12.75 + (9 - 5.4)(1 - 5.4) + (5.4 - 4.5)(8 + 1 + 3 \times 5.4 - 5 \times 4.5) = -12.75 + (3.6)(-4.4) + (0.9)(9 + 16.2 - 22.5) = -12.75 + (-15.84) + (0.9)(2.7) = -26.16$ Operations in this step: 4 multiplications, 4 additions, 5 subtractions (use 4+1 calculated in step 1)

4. Use equation 422 to calculate the autocorrelation $\rho^{II}_{(2,1)}$ $$\rho^{II}_{(2,1)} = \frac{covX^{II}_{(2,1)}}{SX_2} = \frac{-26.16}{45.2} = -0.5787610619469027$$

Operations in this step: 1 division

There are a total of 2 divisions, 8 multiplications, 7 additions and 6 subtractions when incrementally calculating the autocorrelation with lag $l = 1$ on a computation window of size 5.

Fig. 5B Cont'd 1

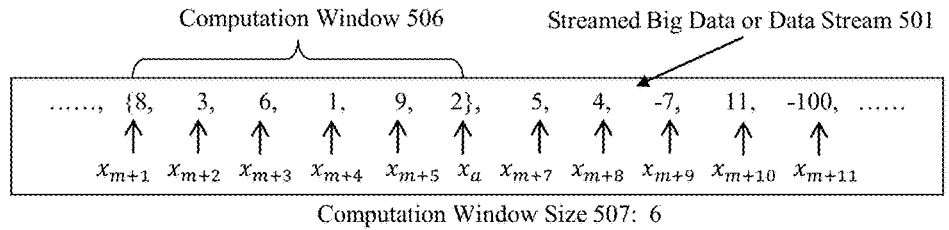

Computation Window Size 507: 6

Calculate Autocorrelation at lag 1 for Computation Window 506

Incremental Algorithm 1:

1. Use equation 409 to incrementally calculate $\bar{x}_3$ for 3$^{rd}$ iteration:

$$\bar{x}_3 = \frac{5\bar{x}_2 + x_a}{5+1} = \frac{5 \times 5.4 + 2}{6} = \frac{29}{6} = 4.8333333333333333 \quad \text{(keep 5+1)}$$

Operations in this step: 1 division, 1 multiplication, 2 additions

2. Use equation 412 to incrementally calculate $SS_3$ and equation 415 to incrementally calculate $SX_3$ $$SS_3 = SS_2 + x_a^2 = 191 + 2^2 = 191 + 4 = 195$$

$$SX_3 = SS_3 - (5+1)\bar{x}_3^2 = 195 - 6 \times 4.8333333333333333^2 = 54.8333333333333353$$

Operations in this step: 3 multiplications, 1 addition, 1 subtraction (use 5+1 calculated in step 1)

3. Use equation 421 to incrementally calculate $covX^{II}_{(3,1)}$ with $n = 5, l = 1$ for 3$^{rd}$ iteration:

$covX^{II}_{(3,1)} = covX^{II}_{(2,1)} + (x_a - \bar{x}_3)(x_{5+1-1} - \bar{x}_3) + (\bar{x}_3 - \bar{x}_2)(\sum_{m+1}^{m+1} x_i + \sum_{m+5+1-1}^{m+5} x_i + (5-1)\bar{x}_3 - (5+1)\bar{x}_2) = -40.1944444444444444$ Operations in this step: 4 multiplications, 4 additions, 5 subtractions (use 5+1 calculated in step 1)

4. Use equation 422 to calculate the autocorrelation $\rho^{II}_{(3,1)}$ $$\rho^{II}_{(3,1)} = \frac{covX^{II}_{(3,1)}}{SX_3} = \frac{-40.1944444444444444}{54.8333333333333353} = -0.7330293819655522$$

Operations in this step: 1 division

There are a total of 2 divisions, 8 multiplications, 7 additions and 6 subtractions when incrementally calculating the autocorrelation at lag $l = 1$ on a computation window of size 6.

Fig. 5B Cont'd 2

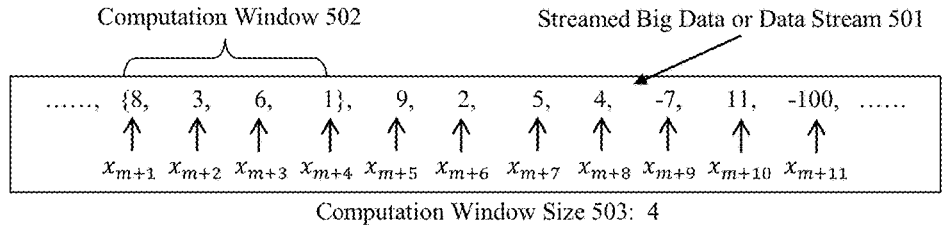

Computation Window Size 503: 4

Calculate Autocorrelation at lag 1 for Computation Window 502

Incremental Algorithm 2:

1. Calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Use equation 423 to calculate $SX_1 = \sum_{m+1}^{m+4}(x_i - \bar{x}_1)^2$ for the 1st iteration:

$$SX_1 = \sum_{m+1}^{m+4}(x_i - \bar{x}_1)^2 = (8 - 4.5)^2 + (3 - 4.5)^2 + (6 - 4.5)^2 + (1 - 4.5)^2 = 29$$

Operations in this step: 6 multiplications, 3 additions, 1 subtraction

3. Use equation 426 to calculate $covX_{(1,1)}$ for the 1st iteration:

$$covX_{(1,1)} = \sum_{m+1+1}^{m+4}(x_i - \bar{x}_1)(x_{i-1} - \bar{x}_1) = -12.75$$

Operations in this step: 3 multiplications, 2 additions, 6 subtractions

4. Use equation 403 to calculate the autocorrelation $\rho_{(1,1)}$ for the 1st iteration:

$$\rho_{(1,1)} = \frac{\sum_{m+1+1}^{m+4}(x_i-\bar{x}_1)(x_{i-1}-\bar{x}_1)}{\sum_{m+1}^{m+4}(x_i-\bar{x}_1)^2} = \frac{\sum_{m+2}^{m+4}(x_i-\bar{x}_1)(x_{i-1}-\bar{x}_1)}{\sum_{m+1}^{m+4}(x_i-\bar{x}_1)^2} = \frac{covX_{(1,1)}}{SX_1} = \frac{-12.75}{29} = -0.4396551724137931$$

Operations in this step: 1 division

There are a total of 2 divisions, 9 multiplications, 8 additions and 7 subtractions when calculating the autocorrelation at lag $l = 1$ on a computation window of size 4.

Fig. 5C

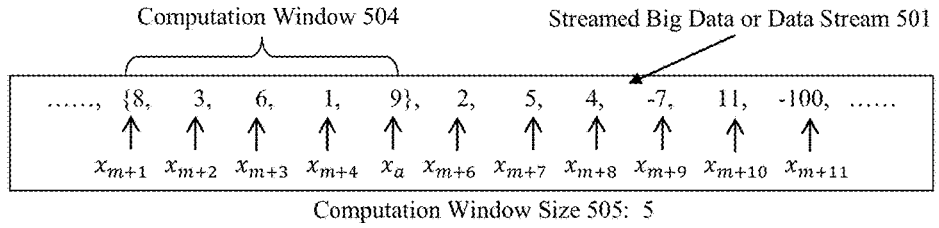

Computation Window Size 505: 5

Calculate Autocorrelation at lag 1 for Computation Window 504

Incremental Algorithm 2:

1. Use equation 409 to incrementally calculate $\bar{x}_2$ for the 2$^{nd}$ iteration:

$$\bar{x}_2 = \frac{4\bar{x}_1 + x_a}{4+1} = \frac{4 \times 4.5 + 9}{5} = \frac{27}{5} = 5.4 \quad \text{(keep 4+1)}$$

Operations in this step: 1 division, 1 multiplication, 2 additions

2. Use equation 425 to incrementally calculate $SX_2$ for the 2$^{nd}$ iteration:

$$SX_2 = SX_1 + (x_a - \bar{x}_2)(x_a - \bar{x}_1) = 29 + (9 - 5.4)(9 - 4.5) = 29 + 3.6 \times 4.5 = 45.2$$

Operations in this step: 1 multiplication, 1 addition, 2 subtractions

3. Use equation 428 to incrementally calculate $covX^{II}_{(2,1)}$ with $n = 4, l = 1$ for the 2$^{nd}$ iteration:

$$covX^{II}_{(2,1)} = covX_{(1,1)} + (x_a - \bar{x}_2)(x_{4+1-1} - \bar{x}_2) + (\bar{x}_2 - \bar{x}_1)(\sum_{m+1}^{m+1} x_i + \sum_{m+4+1-1}^{m+4} x_i + (4-1)\bar{x}_2 - (4+1)\bar{x}_1) = -12.75 + (x_a - \bar{x}_2)(x_4 - \bar{x}_2) + (\bar{x}_2 - \bar{x}_1)(x_1 + x_4 + 3\bar{x}_2 - 5\bar{x}_1) = -12.75 + (9 - 5.4)(1 - 5.4) + (5.4 - 4.5)(8 + 1 + 3 \times 5.4 - 5 \times 4.5) = -26.16$$

Operations in this step: 4 multiplications, 4 additions, 5 subtractions (use 4+1 calculated in step 1)

4. Use equation 429 to calculate the autocorrelation $\rho^{II}_{(2,1)}$ $$\rho^{II}_{(2,1)} = \frac{covX^{II}_{(2,1)}}{SX_2} = \frac{-26.16}{45.2} = -0.5787610619469027$$

Operations in this step: 1 division

There are a total of 2 divisions, 6 multiplications, 7 additions and 7 subtractions when incrementally calculating the autocorrelation at lag $l = 1$ on a computation window of size 5.

Fig. 5C Cont'd 1

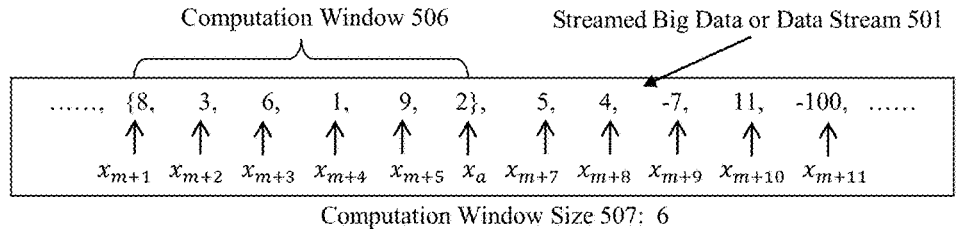

Computation Window Size 507: 6

Calculate Autocorrelation at lag 1 for Computation Window 506

Incremental Algorithm 2:

1. Use equation 409 to incrementally calculate $\bar{x}_3$ for the 3$^{rd}$ iteration:

$$\bar{x}_3 = \frac{5\bar{x}_2 + x_a}{5+1} = \frac{5 \times 5.4 + 2}{6} = \frac{29}{6} = 4.8333333333333333 \quad \text{(keep 5+1)}$$

Operations in this step: 1 division, 1 multiplication, 2 additions

2. Use equation 425 to incrementally calculate $SX_3$ for the 3$^{rd}$ iteration:

$SX_3 = SX_2 + (x_a - \bar{x}_3)(x_a - \bar{x}_2) = 45.2 + (2 - 4.8333333333333333)(2 - 5.4) = 45.2 + (-2.8333333333333333)(-3.4) = 45.2 + 9.6333333333333322 = 54.8333333333333322$ Operations in this step: 1 multiplication, 1 addition, 2 subtractions 3. Use equation 428 to incrementally calculate $covX^{II}{}_{(3,1)}$ with $n = 5, l = 1$ for the 3$^{rd}$ iteration:

$covX^{II}{}_{(3,1)} = covX^{II}{}_{(2,1)} + (x_a - \bar{x}_3)(x_{5+1-1} - \bar{x}_3) + (\bar{x}_3 - \bar{x}_2)\left(\sum_{m+1}^{m+1} x_i + \sum_{m+5+1-1}^{m+5} x_i + (5-1)\bar{x}_3 - (5+1)\bar{x}_2\right) = -40.1944444444444444$ Operations in this step: 4 multiplications, 4 additions, 5 subtractions (use 5+1 calculated in step 1)

4. Use equation 429 to calculate the autocorrelation $\rho^{II}{}_{(3,1)}$ for the 3$^{rd}$ iteration:

$$\rho^{II}{}_{(3,1)} = \frac{covX^{II}{}_{(3,1)}}{SX_3} = \frac{-40.1944444444444444}{54.8333333333333322} = -0.7330293819655522$$

Operations in this step: 1 division

There are a total of 2 divisions, 6 multiplications, 7 additions and 7 subtractions when incrementally calculating the autocorrelation at lag $l = 1$ on a computation window of size 6.

Fig. 5C Cont'd 2

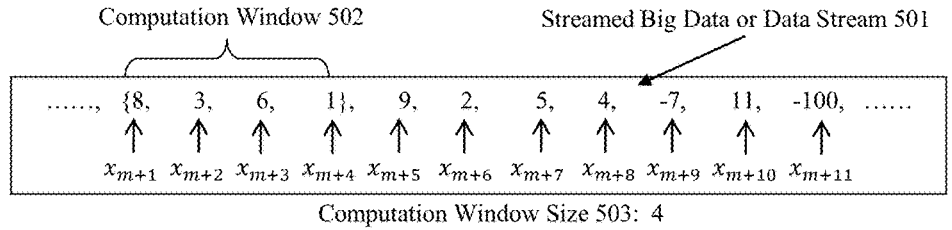

Computation Window Size 503: 4

Calculate Autocorrelation at lag 1 for Computation Window 502

Incremental Algorithm 3:

1. Calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Use equation 433 to calculate $SX_1 = \sum_{m+1}^{m+4}(x_i - \bar{x}_1)^2$ for the 1st iteration $$SX_1 = \sum_{m+1}^{m+4}(x_i - \bar{x}_1)^2 = (8 - 4.5)^2 + (3 - 4.5)^2 + (6 - 4.5)^2 + (1 - 4.5)^2 = 29$$

Operations in this step: 6 multiplications, 3 additions, 1 subtraction

3. Use equation 436 to calculate $covX_{(1,1)}$ for the 1st iteration:

$$covX_{(1,1)} = \sum_{m+1+1}^{m+4}(x_i - \bar{x}_1)(x_{i-1} - \bar{x}_1) = -12.75$$

Operations in this step: 3 multiplications, 2 additions, 6 subtractions

4. Use equation 403 to calculate the autocorrelation $\rho_{(1,1)}$ for the 1st iteration:

$$\rho_{(1,1)} = \frac{\sum_{m+1+1}^{m+4}(x_i - \bar{x}_1)(x_{i-1} - \bar{x}_1)}{\sum_{m+1}^{m+4}(x_i - \bar{x}_1)^2} = \frac{\sum_{m+2}^{m+4}(x_i - \bar{x}_1)(x_{i-1} - \bar{x}_1)}{\sum_{m+1}^{m+4}(x_i - \bar{x}_1)^2} = \frac{covX_{(1,1)}}{SX_1} = \frac{-12.75}{29} = -0.4396551724137931$$

Operations in this step: 1 division

There are a total of 2 divisions, 9 multiplications, 8 additions and 7 subtractions when calculating the autocorrelation at lag $l = 1$ on a computation window of size 4.

Fig. 5D

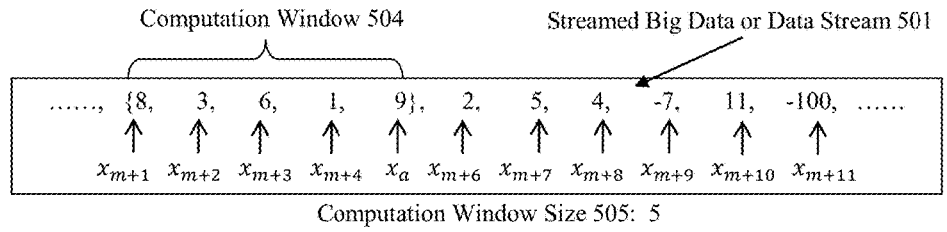

Computation Window Size 505: 5

<u>Calculate Autocorrelation at lag 1 for Computation Window 504</u>

Incremental Algorithm 3:

1. Use equation 409 to incrementally calculate $\bar{x}_2$ for the 2<sup>nd</sup> iteration:

$$\bar{x}_2 = \frac{4\bar{x}_1 + x_a}{4+1} = \frac{4 \times 4.5 + 9}{5} = \frac{27}{5} = 5.4$$

Operations in this step: 1 division, 1 multiplication, 2 additions

2. Use equation 435 to incrementally calculate $SX_2$ for the 2<sup>nd</sup> iteration:

$$SX_2 = SX_1 + (x_a - \bar{x}_2)(x_a - \bar{x}_1) = 29 + (9 - 5.4)(9 - 4.5) = 29 + 3.6 \times 4.5 = 45.2$$

Operations in this step: 1 multiplication, 1 addition, 2 subtractions

3. Use equation 441 to incrementally calculate $covX^{II}_{(2,1)}$ with $n = 4, l = 1$ for the 2<sup>nd</sup> iteration:

$$covX^{II}_{(2,1)} = covX_{(1,1)} + (x_a - \bar{x}_2)(x_{4+1-1} - \bar{x}_2) + (\bar{x}_2 - \bar{x}_1)(\sum_{m+1}^{m+1} x_i + \sum_{m+4+1-1}^{m+4} x_i + x_a - \bar{x}_2 - 1(\bar{x}_1 + \bar{x}_2)) = -12.75 + (9 - 5.4)(1 - 5.4) + (5.4 - 4.5)(8 + 1 + 9 - 5.4 - 1 \times (4.5 + 5.4)) = -12.75 + (3.6)(-4.4) + (0.9)(12.6 - (9.9)) = -26.16$$

Operations in this step: 3 multiplications, 5 additions, 5 subtractions

4. Use equation 442 to calculate the autocorrelation $\rho^{II}_{(2,1)}$ for the 2<sup>nd</sup> iteration:

$$\rho^{II}_{(2,1)} = \frac{covX^{II}_{(2,1)}}{SX_2} = \frac{-26.16}{45.2} = -0.5787610619469027$$

Operations in this step: 1 division

There are a total of 2 divisions, 5 multiplications, 7 additions and 7 subtractions when incrementally calculating the autocorrelation at lag $l = 1$ on a computation window of size 5.

Fig. 5D Cont'd 1

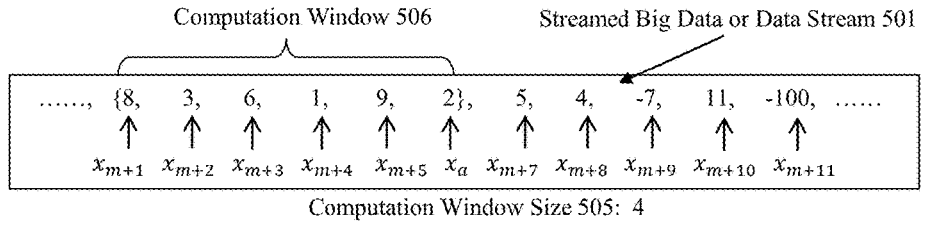

Computation Window Size 505: 4

Calculate Autocorrelation at lag 1 for Computation Window 506

Incremental Algorithm 3:

1. Use equation 409 to incrementally calculate $\bar{x}_3$ for the 3rd iteration:

$\bar{x}_3 = \frac{5\bar{x}_2 + x_a}{5+1} = \frac{5 \times 5.4 + 2}{6} = \frac{29}{6} = 4.8333333333333333$ Operations in this step: 1 division, 1 multiplication, 2 additions 2. Use equation 435 to incrementally calculate $SX_3$ for the 3rd iteration:

$SX_3 = SX_2 + (x_a - \bar{x}_3)(x_a - \bar{x}_2) = 45.2 + (2 - 4.8333333333333333)(2 - 5.4) = 45.2 + (-2.8333333333333333)(-3.4) = 45.2 + 9.63333333333333322 = 54.83333333333333322$ Operations in this step: 1 multiplication, 1 addition, 2 subtractions 3. Use equation 438 to incrementally calculate $covX^{II}{}_{(3,1)}$ with $n = 5, l = 1$ for the 3rd iteration:

$covX^{II}{}_{(3,1)} = covX^{II}{}_{(2,1)} + (x_a - \bar{x}_3)(x_{5+1-1} - \bar{x}_3) + (\bar{x}_3 - \bar{x}_2)(\sum_{m+1}^{m+1} x_i + \sum_{m+5+1-1}^{m+5} x_i + x_a - \bar{x}_3 - 1(\bar{x}_2 + \bar{x}_3)) = -40.1944444444444446$ Operations in this step: 3 multiplications, 5 additions, 5 subtractions 4. Use equation 439 to calculate the autocorrelation $\rho^{II}{}_{(3,1)}$ for the 3rd iteration:

$\rho^{II}{}_{(3,1)} = \frac{covX^{II}{}_{(3,1)}}{SX_3} = \frac{-40.1944444444444446}{54.83333333333333322} = -0.7330293819655522$ Operations in this step: 1 division There are a total of 2 divisions, 5 multiplications, 7 additions and 7 subtractions when incrementally calculating the autocorrelation at lag $l = 1$ on a computation window of size 6.

Fig. 5D Cont'd 2

|  | Division | Multiplication | Addition | Subtraction |
|---|---|---|---|---|
| Traditional Algorithm | 2 | 11 | 14 | 16 |
| Incremental Algorithm 1 | 2 | 8 | 7 | 6 |
| Incremental Algorithm 2 | 2 | 6 | 7 | 7 |
| Incremental Algorithm 3 | 2 | 5 | 7 | 7 |

|  | Division | Multiplication | Addition | Subtraction |
|---|---|---|---|---|
| Traditional Algorithm | 2 | 1,999,999 | 2,999,996 | 2,999,998 |
| Incremental Algorithm 1 | 2 | 8 | 7 | 6 |
| Incremental Algorithm 2 | 2 | 6 | 7 | 7 |
| Incremental Algorithm 3 | 2 | 5 | 7 | 7 |

INCREMENTAL AUTOCORRELATION
CALCULATION FOR STREAMED DATA
USING COMPONENTS

CROSS-REFERENCE TO RELATED APPLICATIONS

This application claims the benefit of provisional patent application Ser. No. 62/089,261, filed 2014 Dec. 9 by the present inventor.

BACKGROUND AND RELEVANT ART

Internet, mobile communications, navigation, online gaming, sensing technologies and large scale computing infrastructures are producing large amounts of data every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Streamed data may also be data continuously read from storage devices, e.g., storage devices on multi-computing devices which store a Big Data set. Stream processing becomes one of the focused research areas due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated stock trading, etc. The third reason is that some applications or electronic devices require streaming processing due to their nature, e.g., audio, video and digital TV, etc.

Processing Big Data or streamed data may include performing calculations on multiple data elements. When performing some statistical calculations on Big Data or streamed data, the number of data elements to be accessed may be quite large. For example, when calculating an autocorrelation a (potentially large) number of data elements may need to be accessed.

Further, some statistical calculations are recalculated as new data are added to a Big Data set or new streamed data elements are accessed or received. Thus, the (potentially large) number of data elements may be repeatedly accessed. For example, it may be that an autocorrelation is calculated for a computation window whose size n keeps increasing to include the newly accessed or received data element in a data stream. As such, every time a new data element is accessed or received, the new element is added to the computation window. The n+1 data elements in the adjusted computation window are then accessed to recalculate the autocorrelation.

When performing an autocorrelation on n+1 data elements all the n+1 data elements in the computation window will be visited and used at least once at a given lag.

In addition, algorithms on streamed data processing may be extended to Big Data processing, because Big Data sets are accumulated over time and they may be considered as a data stream with irregular time intervals. Depending on necessity, the computation window size n may be extremely large, so the data elements in a computation window may be distributed over a cloud comprising hundreds of thousands of computing devices. Re-performing an autocorrelation calculation on Big Data sets after some data changing in traditional ways results in slow response and significant waste of computing resources.

BRIEF SUMMARY

The present disclosure describes methods, systems, and computing system program products for incrementally calculating an autocorrelation at a specified lag l for streamed data. A computing system comprises one or more computing devices. Each of the computing devices comprises one or more processors. The computing system has access to a data stream. The computing system comprises one or more storage media. The one or more storage media comprising a data buffer for storing streamed data elements. The computing system maintains a computation window size counter. The computation window size counter indicates the number of data elements in a computation window of the data stream. Incrementally calculating an autocorrelation at the specified lag l for an adjusted computation window includes incrementally calculating one or more (p (p≥1)) components of the autocorrelation for the adjusted computation window based on one or more components of an autocorrelation at the specified lag for a previous computation window and then calculating the autocorrelation for the adjusted computation window as needed by using one or more incrementally calculated components at the specified lag. Incrementally calculating autocorrelation avoids visiting all data elements in the adjusted computation window and performing redundant computations thereby increasing calculation efficiency, saving computing resources and reducing computing system's power consumption. The computing system also includes a data buffer for storing accessed or received data elements. The buffer may reside in memory or other non-transitory computer-readable media, such as a hard disk or other media, and may include multiple distributed files on multiple distributed computing devices, such as may be connected end-to-end to form a "circular buffer".

The computing system incrementally calculates one or more components of an autocorrelation at a specified lag l starting from either an empty computation window or a non-empty computation window where a computation window size and one or more components have already been initialized.

When incremental autocorrelation calculation starts from an empty computation window, the computation window size is initialized with a zero and one or more components are initialized with zero values.

When incremental autocorrelation calculation starts from a non-empty computation window, the computation window size and one or more components are initialized. The initialization of the computation window size comprises counting the number of data elements contained in the computation window or accessing or receiving a specified computation window size. The initialization of the one or more components comprises calculating the one or more components through their definitions by using the data elements in the computation window or accessing or receiving pre-calculated one or more components from one or more computing-device-readable media.

The computing system accesses or receives a new Big Data or streamed data element.

The computing system stores the accessed or received data element into a data buffer. Incremental autocorrelation calculation needs access to l data elements accessed or received at the beginning of a computation window and l data elements accessed or received at the end of the computation window.

The computing system adjusts the computation window by adding the new data element to the computation window and adjusts the computation window size by increasing its value by 1. The computing system calculates one or more components at the specified lag l using the new data element accessed or received.

At the specified lag l, the computing system directly incrementally calculates one or more (v ($1 \le v \le p$)) components of an autocorrelation at the given lag l for the adjusted computation window by using one or more components at the given lag l for the previous computation window. Directly incrementally calculating the v components of an autocorrelation at the given lag l includes accessing l data elements from each side of the computation window plus the new Big Data or streamed data element added to the computation window and accessing each of the v components at the given lag l calculated for the previous computation window. Directly incrementally calculating the v components of an autocorrelation at the given lag l includes mathematically adding a contribution of the new Big Data or streamed data element added to the computation window to each of the v components at the given lag l.

The computing system indirectly incrementally calculating w=p−v components at the given lag l and calculating an autocorrelation at the given lag by using one or more incrementally calculated components at the given lag. At the given lag, the computing system indirectly incrementally calculating w=p−v components as needed, i.e., only calculate them when an autocorrelation is accessed. Indirectly incrementally calculating the w components includes indirectly incrementally calculating each of the w components one by one. Indirectly incrementally calculating a component includes accessing one or more directly incrementally calculated components at the given lag. Indirectly incrementally calculating a component includes calculating the component using components other than the component itself. The components used for calculating an indirectly incrementally calculated component may be directly incrementally calculated, indirectly incrementally calculated or initialized.

The computing system generates an autocorrelation at the given lag as needed by using one or more incrementally calculated components at the given lag.

The computing system may keep accessing or receiving a new data element, storing the data element into a data buffer, adjusting the computation window and the computation window size, directly incrementally calculating v ($1 \le v \le p$) components at the specified lag l, indirectly incrementally calculating w=p−v components at the specified lag l as needed and generating autocorrelations at the specified lag l as needed, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of an autocorrelation and traditional equations for calculating an autocorrelation.

FIG. 4B illustrates some example components of an autocorrelation and basic incremental component calculation equations.

FIG. 4C illustrates the equations of the first example incremental autocorrelation calculation algorithm (incremental algorithm 1).

FIG. 4D illustrates the equations of the second example incremental autocorrelation calculation algorithm (incremental algorithm 2).

FIG. 4E illustrates the equations of the third example incremental autocorrelation calculation algorithm (incremental algorithm 3).

FIG. 5A illustrates an example of calculating autocorrelation using traditional algorithms as shown in FIG. 4A.

FIG. 5B illustrates an example of calculating autocorrelation using incremental algorithm 1 as shown in FIG. 4C.

FIG. 5C illustrates an example of calculating autocorrelation using incremental algorithm 2 as shown in FIG. 4D.

FIG. 5D illustrates an example of calculating autocorrelation using incremental algorithm 3 as shown in FIG. 4E.

FIG. 6 illustrates computational loads for traditional autocorrelation algorithms and incremental autocorrelation algorithms with a computation window of size 6.

FIG. 7 illustrates computational loads for traditional autocorrelation algorithms and incremental autocorrelation algorithms with a computation window of size 1,000,000.

DETAILED DESCRIPTION

Figure 1:
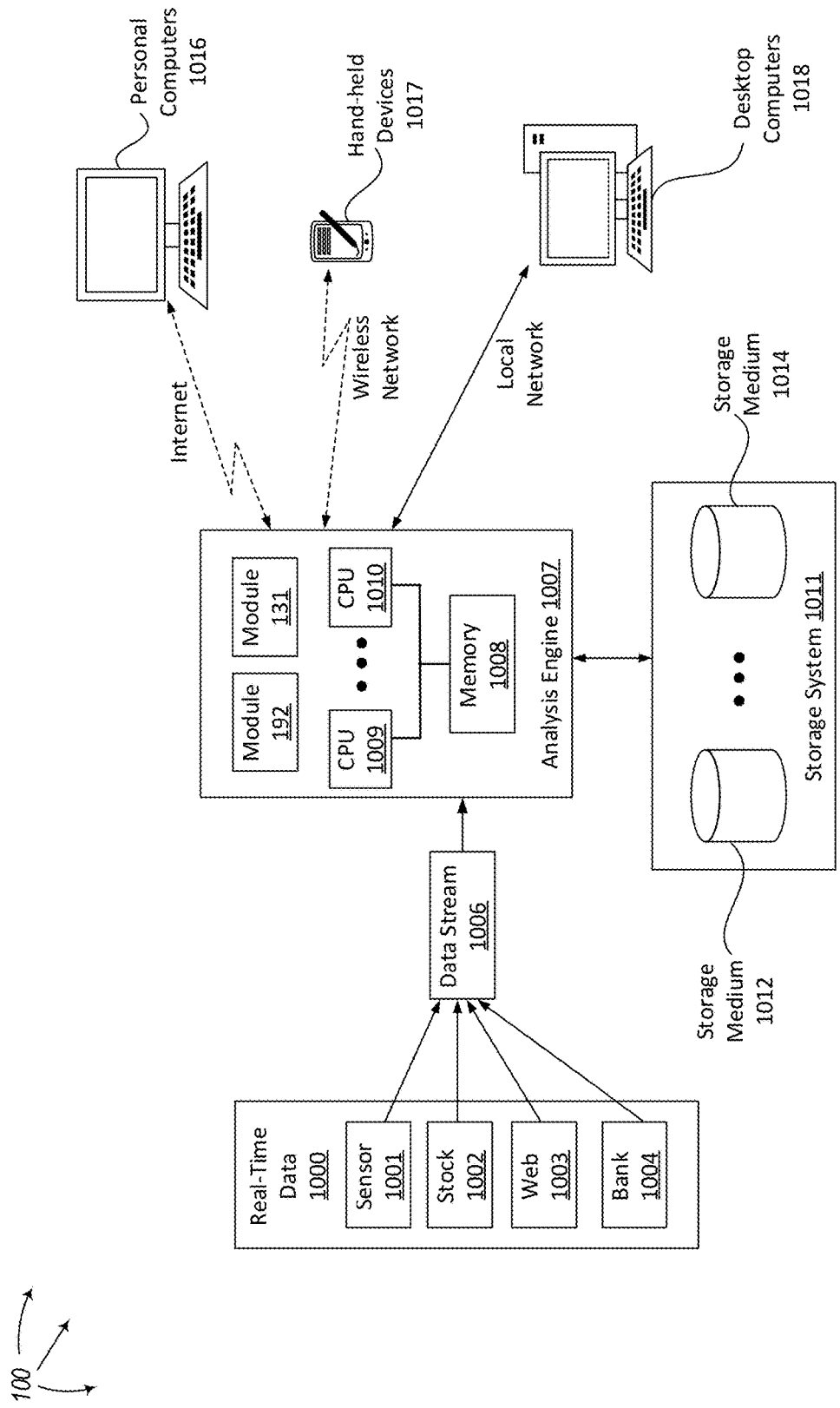
FIG. 1 illustrates a high-level overview of an example computing system that facilitates incrementally calculating autocorrelation for streamed data.

The present disclosure describes methods, systems, and computing system program products for incrementally calculating an autocorrelation at a specified lag l for streamed data. A computing system comprises one or more computing devices. Each of the computing devices comprises one or more processors. The computing system has access to a data stream. The computing system comprises one or more storage media. The one or more storage media comprising a data buffer for storing streamed data elements. The computing system maintains a computation window size counter. The computation window size counter indicates the number of data elements in a computation window of the data stream. Incrementally calculating an autocorrelation at the specified lag l for an adjusted computation window includes incrementally calculating one or more (p (p≥1)) components of the autocorrelation for the adjusted computation window based on one or more components of an autocorrelation at the specified lag for a previous computation window and then calculating the autocorrelation for the adjusted computation window as needed by using one or more incrementally calculated components at the specified lag. Incrementally calculating autocorrelation avoids visiting all data elements in the adjusted computation window and performing redundant computations thereby increasing calculation efficiency, saving computing resources and reducing computing system's power consumption. The computing system also includes a data buffer for storing accessed or received data elements. The buffer may reside in memory or other non-transitory computer-readable media, such as a hard disk or other media, and may include multiple distributed files on multiple distributed computing devices, such as may be connected end-to-end to form a "circular buffer".

An autocorrelation is a measure of the correlation of a particular time series with the same time series delayed by l lags. It is also called "lagged correlation" or "serial correlation". It is obtained by dividing the covariance between two observations, separated by l lags, of a time series by the standard deviation. For a time series that does not change over time, the autocorrelation decreases exponentially to 0. The value of an autocorrelation is between −1 and +1. A value of 1 indicates there is a perfect positive linear relationship between the time series' past and future values. A value of −1 indicates there is an exact negative linear relationship between the time series' past and future values.

A computation window is a range of data elements which are involved in an autocorrelation calculation. The data elements in a computation window have orders, i.e., changing the relative positions of the data elements contained in a computation window may affect the computing results of an autocorrelation for the computation window.

A component of an autocorrelation is a quantity or expression appearing in the autocorrelation's definition equation or any transforms of the equation. An autocorrelation is the largest component of an autocorrelation itself. An autocorrelation may be calculated by using one or more components of the autocorrelation. Some example components of an autocorrelation may be found in FIG. 4B.

A component may be either directly incrementally calculated or indirectly incrementally calculated. The difference between them is that when directly incrementally calculating a component the component is calculated by using the component's value in previous iteration but when indirectly incrementally calculating a component the component is calculated by using components other than the component itself.

For a given component, it might be directly incrementally calculated in one algorithm but indirectly incrementally calculated in another algorithm.

For a given algorithm, assume the total number of different components is p (p≥1), the number of directly incrementally calculated components is v (1≤v≤p), then the number of indirectly incrementally calculated components is w=p−v (0≤w<p). For any algorithm, there will be at least one component being directly incrementally calculated. It is possible that all components are directly incrementally calculated (in this case v=p and w=0). However, directly incrementally calculated components must be calculated in every iteration no matter if an autocorrelation is accessed or not in a specific iteration.

For a given algorithm, if a component is directly incrementally calculated, then the component must be calculated in every iteration (i.e., whenever a new data element is added to the computation window). However, if a component is indirectly incrementally calculated, then the component may be calculated as needed using one or more components other than the component itself, i.e., only when an autocorrelation needs to be calculated and accessed. Thus, when an autocorrelation is not accessed in a specific iteration, only a small number of components are incrementally calculated to save computation time. It should be understood that an indirectly incrementally calculated component may also be used in the calculation of a directly incrementally calculated component. In that case, the indirectly incrementally calculated component should also be calculated in every iteration.

Embodiments of the invention include incrementally calculating each of the one or more components of autocorrelations at a specified lag in an adjusted computation window based on one or more components of autocorrelations at a specified lag calculated for a previous computation window.

The computing system incrementally calculates one or more components of an autocorrelation starting from either an empty computation window or a non-empty computation window where a computation window size and one or more components have already been initialized.

When the computing system incrementally calculating one or more components of an autocorrelation starting from an empty computation window, the computation window size is initialized with a zero and one or more components are initialized with zero values.

When incremental autocorrelation calculation starts from a non-empty computation window, the computation window size and one or more components are initialized. The initialization of the computation window size comprises counting the number of data elements contained in the computation window or accessing or receiving a specified computation window size. The initialization of the one or more components comprises calculating the one or more components through their definitions by using the data elements in the computation window or accessing or receiving pre-calculated one or more components from one or more computing-device-readable media.

When initializing one or more (v ($1 \le v \le p$)) components of an autocorrelation from the data elements in the computation window, the computing system initializes a lag with a value l ($1 \le l < n$). The computing system calculates one or more components of an autocorrelation at the given lag l for the computation window according to their definitions using the data elements in the computation window.

The computing system accesses or receives a new streamed Big Data or streamed data element.

The computing system stores the accessed or received data element into a data buffer.

The computing system adjusts the computation window by adding the new data element to the computation window and adjusts the computation window size by increasing its value by 1.

The computing system directly incrementally calculates one or more (v ($1 \le v \le p$)) components of an autocorrelation at the given lag l for the adjusted computation window. Directly incrementally calculating the v components at the given lag l includes directly incrementally calculating each of the v components at the given lag l one by one. Directly incrementally calculating a component at the given lag l includes: accessing l data elements from each side of the computation window plus the new data element added to the computation window, accessing the v components calculated for the previous computation window and mathematically adding a contribution of the new data element added to the computation window to each of the v components.

The computing system indirectly incrementally calculates one or more (w ($w=p-v$)) components of an autocorrelation at the given lag l for the adjusted computation window and then calculates the autocorrelation at the given lag l for the adjusted computation window using one or more incrementally calculated components as needed. Indirectly incrementally calculating the w components includes indirectly incrementally calculating each of the w components one by one. Indirectly incrementally calculating a component includes calculating the component using components other than the component itself (Depending on a specific algorithm used, calculating each of the w components may also need access and use the new data element added to the computation window). The computing system may generate an autocorrelation at the given lag l for the adjusted computation window as needed based on one or more of the incrementally calculated components.

The computing system may keep accessing or receiving a new data element, storing the data element into a data buffer, adjusting the computation window and the computation window size, directly incrementally calculating v ($1 \le v \le p$) components at the specified lag l, indirectly incrementally calculating $w=p-v$ components at the specified lag l as needed and generating autocorrelations at the specified lag l as needed, and the computing system may repeat this process for as many times as needed.

Embodiments of the present invention may comprise or utilize a special purpose or general-purpose computing device including computing device hardware, such as, for example, one or more processors and system memory, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device or special purpose computing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, minicomputers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

Within this description and the following claims, a "circular buffer" is a data structure that uses a single, fixed-size "buffer" as if it were connected end-to-end. A circular buffer may also be referred to as a cyclic buffer or a ring buffer. The "buffer" may be a commonly used circular buffer which is generally a space allocated in a local memory. The "buffer" may also be a "virtual circular buffer" which may reside in memory or other non-transitory computer-readable media, such as a hard disk or other media, and may include multiple distributed files on multiple distributed computing devices, such as may be connected end-to-end to form a "circular buffer".

FIG. 1 illustrates a high-level overview of an example computing system 100 that facilitates incrementally calculating autocorrelation for streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, and autocorrelation calculation modules 192 and component calculation modules 131. Autocorrelation calculation modules 192 and component calculation module 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. Understanding that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
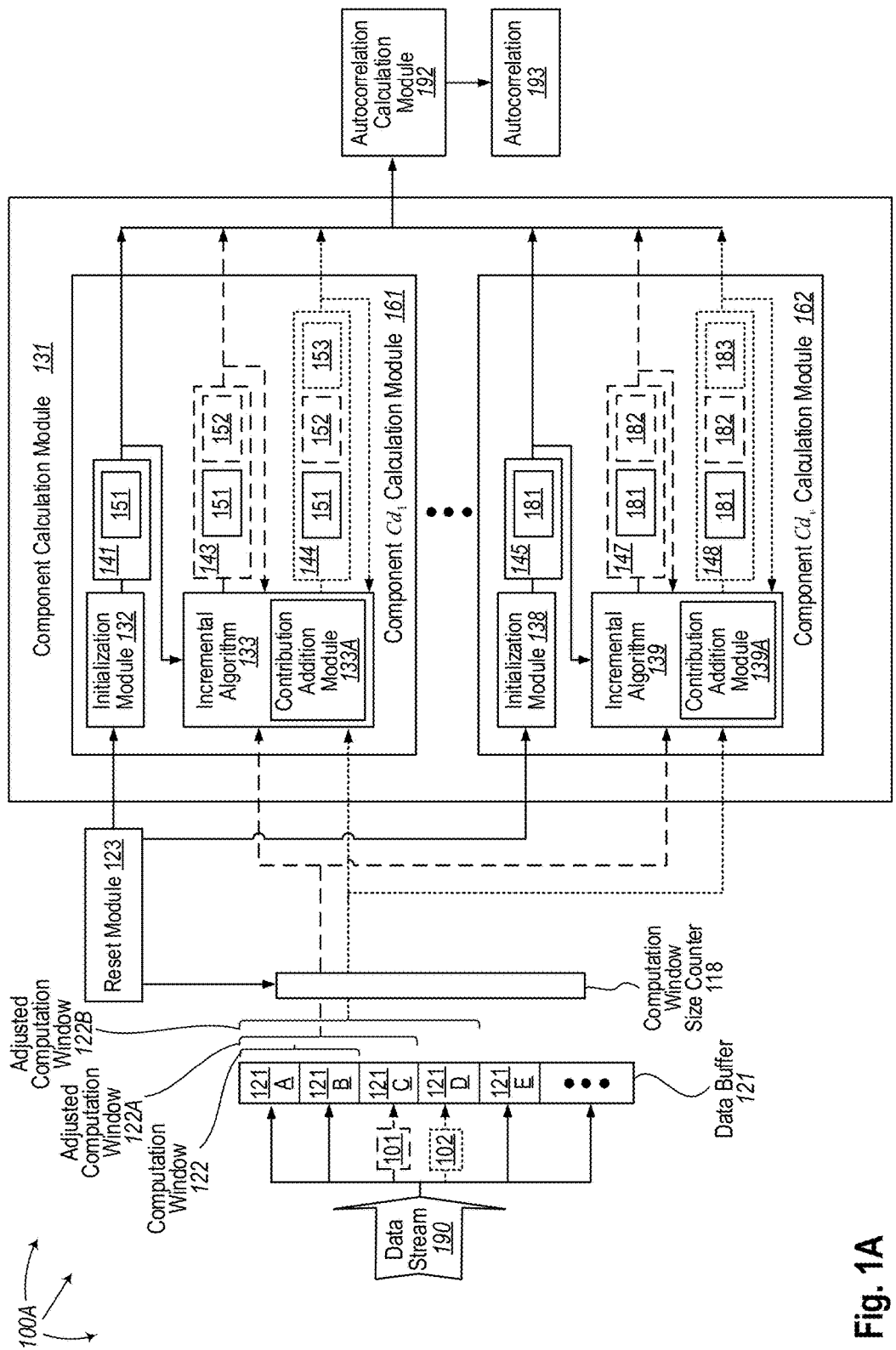
FIG. 1A illustrates an example computing system architecture that facilitates incrementally calculating autocorrelation for Big Data or streamed data with all components being directly incrementally calculated.

FIG. 1A illustrates an example computing system architecture 100A that facilitates incrementally calculating autocorrelation for streamed data with all components (p (p=v≥1)) being directly incrementally calculated. FIG. 1A illustrates 1007 and 1006 shown in FIG. 1. Referring to FIG. 1A, computing system architecture 100A includes component calculation module 131. Component calculation module 131 may be connected to (or is part of) a network, such as, for example, a Local Area Network ("LAN"), a Wide Area Network ("WAN"), and even the Internet. Accordingly, component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol CRT SP"), Real-time Transport Protocol ("RTP"), Microsoft® Media Server ("MIMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of autocorrelation calculation module 192, and autocorrelation calculation module 192 will generate autocorrelation 193.

In general, data stream 190 may be a sequence of digitally encoded signals (e.g., packets of data or data packets) used to transmit or receive information that is in the process of being transmitted. Data stream 190 may stream data elements, such as, for example, stock quotes, audio data, video data, geospatial data, web data, mobile communication data, online gaming data, banking transaction data, sensor data, closed-captioning data, etc., to computing system architecture 100A. Data stream 190 may stream stored data or be a live stream.

As streamed data elements are accessed or received, the streamed data elements may be placed in a location within a data buffer 121. For example, data element 101 may be placed in location 121C.

Subsequently, data element 102 may be accessed or received. Data element 102 may be placed in location 121D.

As depicted, data buffer 121 has two existing data elements in location 121A and location 121B respectively before accessing or receiving data element 101. Computation window size will be increased and the computation window will be transitioned to a new computation window as new data elements are placed within circular buffer 121.

As streamed data elements are accessed or received, the streamed data elements bypass a computation window size counter 118 stored in storage device 119. Computation window size counter 118 keeps track of computation window size. Whenever accessing or receiving a new data element the computing system adjusts the computation window by adding the new data element to the computation window and adjusts the computation window size counter 118 by increasing its value by 1. Computation window size counter 118 may be reset to 0 when incremental autocorrelation calculation is reset or set to a specific value when incremental autocorrelation calculation starts working on a non-empty computation window. For example, in 100A, before accessing or receiving data element 101, the computation window 122 contains two data elements stored in location 121A and location 121B respectively, so the computation window size should be initialized as 2. When data element 101 is placed in location 121C, data element 101 is added to computation window 122 and computation window 122 becomes adjusted computation window 122A, and the computation window size counter 118 is added by 1 and becomes 3. Computation window size counter 118 will be stored in storage device 119. Both the computation window size counter 118 and the data element 101 may be accessed by component calculation module 131.

Subsequently, data element 102 may be accessed or received. Data element 102 will be placed in location 121D. Adjusted computation window 122A will become adjusted computation window 122B. The counter 118 will be increased by 1 and becomes 4. The adjusted computation window size counter 118 will be stored in storage device 119. Both the adjusted computation window size counter 118 and the data element 102 may be accessed by component calculation module 131.

In general, component calculation module 131 comprises v (v=p≥1) component calculation modules for directly incrementally calculating v components of autocorrelation at a specified lag l (1≤l<n) for a set of n data elements in a computation window. The number v varies depending on which incremental algorithm is used. As depicted in FIG. 1A, component calculation module 131 comprises component $Cd_1$ calculation module 161 and component $Cd_v$ calculation module 162, and there are v−2 other component calculation modules between them. What between them may be component $Cd_2$ calculation module, component $Cd_3$ calculation module, . . . , and component $Cd_{v-1}$ calculation module. Each component calculation module calculates a specific component at the specified lag l. At the specified lag l, v components are calculated. Calculation module 161 comprises initialization module 132 for initializing component $Cd_1$ at the specified lag l and incremental algorithm 133 for directly incrementally calculating component $Cd_1$ at the specified lag l. Calculation module 162 comprises initialization module 138 for initializing component $Cd_v$ at the specified lag l and incremental algorithm 139 for directly incrementally calculating component $Cd_v$ at the specified lag l. Initialization module 132 is configured to initialize component $Cd_1$ at the specified lag l for data elements in a computation window and initialization module 138 is configured to initialize component $Cd_v$ at the specified lag l for data elements in a computation window. Component $Cd_1$ 141 is the initial value of component $Cd_1$. Initialization module 132 may be used for initialization of component $Cd_1$ or when autocorrelation calculations are reset. Initialization module 132 either initialize component $Cd_1$ 141 to be zero if the computation window is empty (the computation window size counter is zero) or a specific value contribution 151 passed in by reset module 123 if the computation window is non-empty. Similarly, initialization module 138 may be used for initialization of component $Cd_v$ or when autocorrelation calculations are reset. Component $Cd_v$ 145 is the initial value of component $Cd_v$. Initialization module 138 either initialize component $Cd_v$ 145 to be zero if the computation window is empty (the computation window size counter is zero) or a specific value contribution 181 passed in by reset module 123 if the computation window is non-empty.

Incremental algorithms are also configured to directly incrementally calculate v component values for a set of data elements in a computation window. Incremental algorithm 133 accesses or receives a prior component $Cd_1$ at the specified lag l and a most recent data element added to a computation window as input. Incremental algorithm 133 directly incrementally calculates a new component $Cd_1$ at the specified lag l for a computation window from the prior component $Cd_1$ at the specified lag l for the prior computation window and the most recent data element added to the computation window. Contribution addition module 133A may mathematically add a contribution of the most recent data element added to the computation window to the component $Cd_1$ at the specified lag l for the prior computation window. Mathematically adding a contribution of the most recent data element may be used for calculating component $Cd_1$ at the specified lag l for the computation window. Incremental algorithm 139 works in a similar way as incremental algorithm 133. Incremental algorithm 139 accesses or receives a prior component $Cd_v$ at the specified lag l for the prior computation window and a most recent data element added to a computation window as input. Incremental algorithm 139 directly incrementally calculates a new component $Cd_v$ at the specified lag l for the prior computation window from the prior component $Cd_v$ at the specified lag l for the prior computation window and the most recent data element added to the computation window. Contribution addition module 139A may mathematically add a contribution of the most recent data element added to the computation window to the prior component $Cd_v$ at the specified lag l. Mathematically adding a contribution of the most recent data element may be used for calculating component $Cd_v$ at the specified lag l for the computation window.

Referring to FIG. 1A, computing system architecture 100A also includes an autocorrelation calculation module 192, an autocorrelation 193. Once all p components of an autocorrelation at the specified lag l have been directly incrementally calculated by component calculation module 131, autocorrelation calculation module 192 may calculate the autocorrelation 193 at the specified lag l by using one or more incrementally calculated components at the specified lag l.

The computing system may keep accessing or receiving a new data element, storing the data element into a data buffer, adjusting the computation window and the computation window size, directly incrementally calculating v ($1 \le v \le p$) components at the specified lag l, and calculating autocorrelations at the specified lag l as needed, and the computing system may repeat this process for as many times as needed.

Figure 1B:
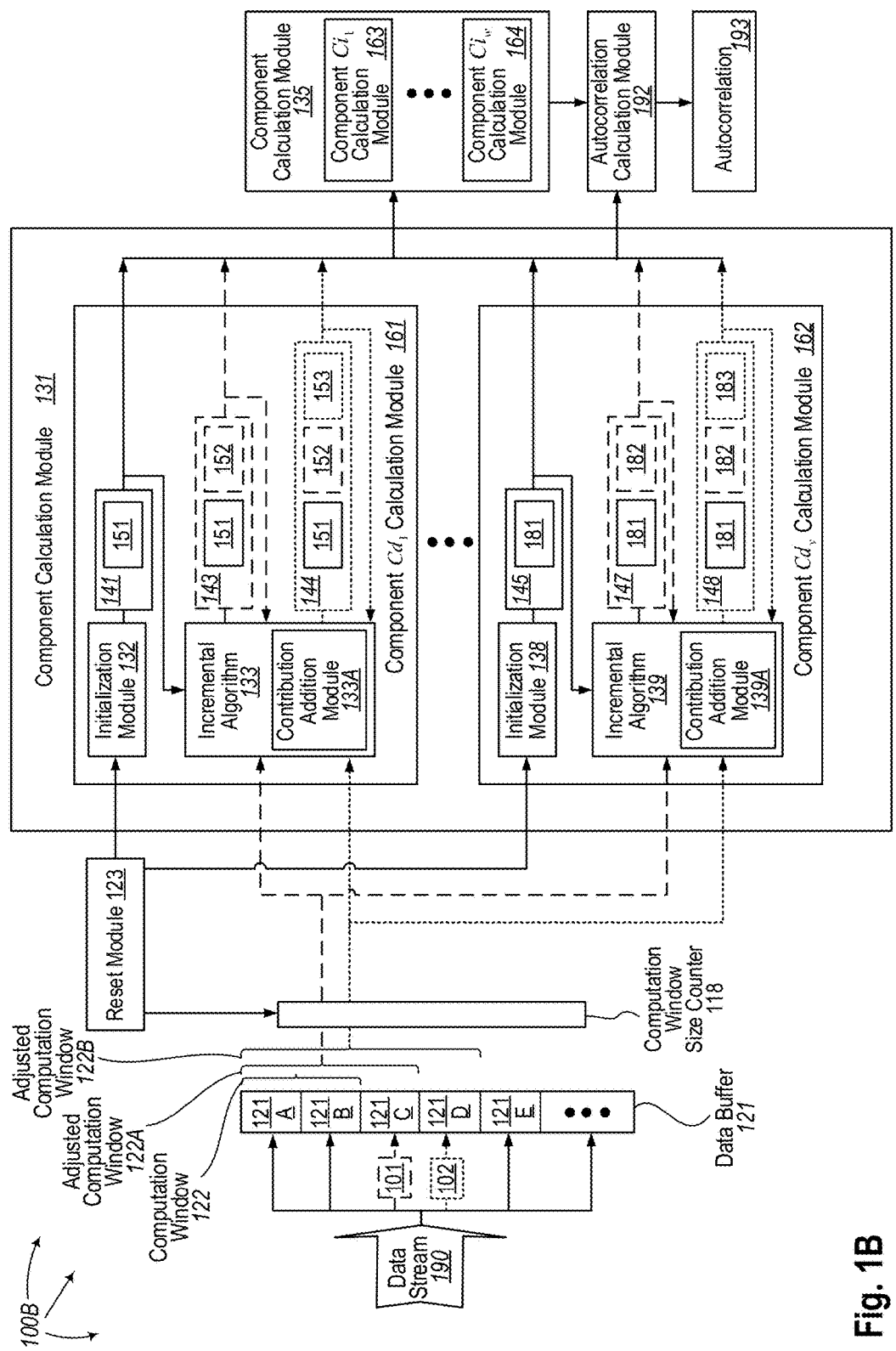
FIG. 1B illustrates an example computing system architecture that facilitates incrementally calculating autocorrelation for Big Data or streamed data with some components being directly incrementally calculated and some components being indirectly incrementally calculated.

FIG. 1B illustrates an example computing system architecture 100B that facilitates incrementally calculating autocorrelation for Big Data or streamed data with some (v ($1 \le v < p$)) components being directly incrementally calculated and some (w (w=p−v)) components being indirectly incrementally calculated. The number v as well as the number w is algorithm dependent. Many parts included in computing system architectures 100B and 100A have same reference numbers. Those parts have similar structures and work in similar ways. In certain implementations, the difference between computing system architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Computing system architecture 100B also includes component calculation module 131, which also includes v component calculation modules for directly incrementally calculating v components, however the number v in 100B may not be the same number v as in 100A, because some directly incrementally calculated components in 100A are indirectly incrementally calculated in 100B. In 100A, v=p≥1, but in 100B, $1 \le v < p$. Referring to FIG. 1B, computing system architecture 100B also includes component calculation module 135. The output of components calculation module 131 may be used as the input of component calculation module 135, and the output of calculation modules 131 and 135 may be used as the input of autocorrelation calculation module 192, and autocorrelation calculation module 192 may generate autocorrelation 193. Component calculation module 135 generally includes w=p−v component calculation modules for indirectly incrementally calculating w components. For example, at the specified lag l, component calculation module 135 includes calculation module 163 for indirectly incrementally calculating component $Ci_1$ at the specified lag l and calculation module 164 for indirectly incrementally calculating component $Ci_w$ at the specified lag l, and there are w−2 component calculation modules in between. Indirectly incrementally calculating w components at the specified lag l includes indirectly incrementally calculating each of the w components at the specified lag l one by one. Indirectly incrementally calculating a component at the specified lag l includes accessing and using one or more components at the specified lag l other than the component itself. The one or more components at the specified lag l may be initialized, directly incrementally calculated or indirectly incrementally calculated.

Referring to computing system architecture 100B, once w=p−v components at the specified lag l have been indirectly incrementally calculated (a total of p (p=v+w) components at the specified lag l have been calculated), autocorrelation calculation module 192 may be used for calculating an autocorrelation 193 at the specified lag l by using one or more incrementally calculated components at the specified lag l.

Figure 2:
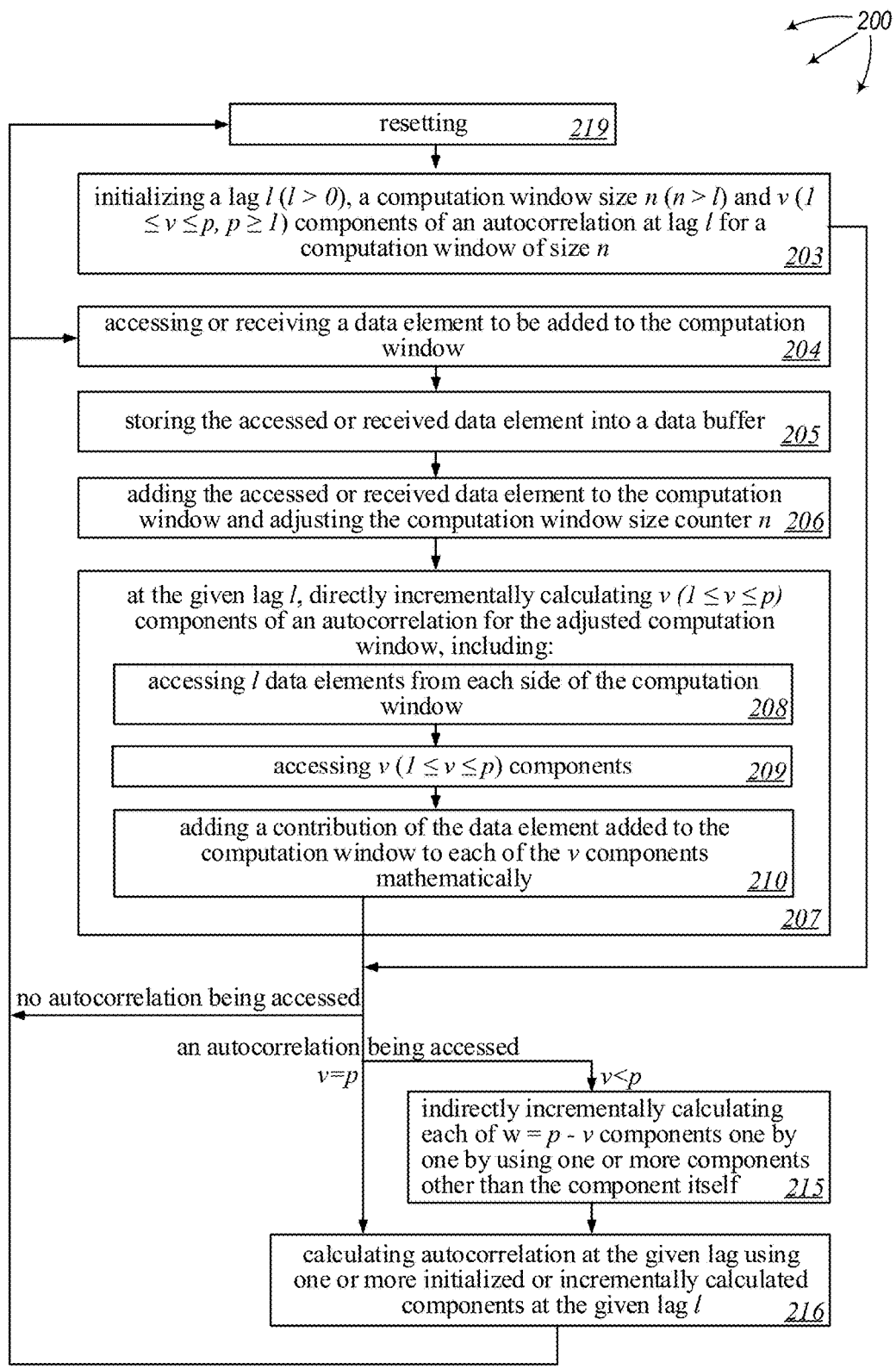
FIG. 2 illustrates a flow chart of an example method for incrementally calculating an autocorrelation for streamed data.

FIG. 2 illustrates a flow chart of an example method 200 for incrementally calculating autocorrelation for streamed data. Method 200 will be described with respect to the components and data of computing system architectures 100A and 100B.

Method 200 includes initializing computation window size counter 118 (201) and initializing v ($1 \le v \le p$) components of an autocorrelation at the specified lag l (203). For example, computation window size counter 118 may be initialized and stored in storage device 119. Initialization module 132 may initialize component $Cd_1$ 141 at the specified lag l with contribution 151. Contribution 151 may be contributions from data elements in 121A and 121B to component $Cd_1$ at the specified lag l. Similarly, initialization module 138 may initialize component $Cd_v$ 145 with contribution 181. Contribution 181 may be contributions from data elements in 121A and 121B to component $Cd_v$ at specified lag l.

Method 200 includes indirectly incrementally calculating each of w=p−v components one by one as needed using one or more components other than the component itself (215), and then calculating autocorrelation at the given lag l using one or more components at the given lag l as needed. Method 200 then includes accessing or receiving a new data element.

Method 200 includes accessing or receiving a new data element to be added to the computation window (204). For example, data element 101 may be accessed or received.

Method 200 includes storing the accessed or received data element into a data buffer (205). For example, after accessing or receiving data element 101, data element 101 may be stored into data buffer 121.

Method 200 includes adding the new data element to the computation window and adjusting the computation window size counter n (206). For example, data element 101 may be added to computation window 122 which then becomes adjusted computation window 122A, computation window size counter 118 may be adjusted by increasing its current value by 1 upon accessing or receiving the new data element 101.

Method 200 includes directly incrementally calculating v ($1 \le v \le p$) components of a next autocorrelation at the given lag l ($1 \le l < n$) for the adjusted computation window by using the v components at the given lag l for the prior computation window, l data elements from each side of the prior computation window and the most recent data element added to the computation window (207). For example, at a given lag l, incremental algorithm 133 may be used for incrementally calculating component $Cd_1$ 143 from component $Cd_1$ 141, and data element 101 added to the computation window. Similarly, incremental algorithm 139 may be used for incrementally calculating component $Cd_v$ 147 from component $Cd_v$ 145 and data element 101 added to the computation window.

Directly incrementally calculating v components of a next autocorrelation at the given lag l includes accessing l data elements at each side of the prior computation window plus the data element added to the computation window (208). For example, incremental algorithm 133 may access data element in 121A and data element in 121B plus data element 101 when calculating component $Cd_1$ at lag l=1. Similarly, incremental algorithm 139 may access data element in 121A and data element in 121B plus data element 101 when calculating component $Cd_v$ at lag l=1.

Directly incrementally calculating v components of a next autocorrelation at the given lag l includes accessing each of the v components of the autocorrelation in the prior computation window (209). For example, incremental algorithm 133 may access component $Cd_1$ 141. Similarly, incremental algorithm 139 may access component $Cd_v$ 145.

Directly incrementally calculating v components of a next autocorrelation at the given lag l includes mathematically adding a contribution of the data element added to the computation window to each of the v components at the given lag l (210). For example, incrementally calculating component $Cd_1$ 143 at lag l=1 may include contribution addition module 133A mathematically adding contribution 152 to component 141 at lag l=1, and incrementally calculating component $Cd_v$ 147 at lag l=1 may include contribution addition module 139A mathematically adding contribution 182 to component $Cd_v$ 145 at lag l=1. Contribution 152 and 182 are contributions from data element 101. As depicted, component $Cd_1$ 143 includes contribution 151 and contribution 152. Contribution 151 is a contribution from initialization (i.e., contributions from data elements in 121A and 121B). Contribution 152 is a contribution from data element 101 to component $Cd_1$ 143. Similarly, as depicted, component $Cd_v$ 147 includes contribution 181 and contribution 182. Contribution 181 is a contribution from initialization (i.e., contributions from data elements in 121A and 121B). Contribution 182 is a contribution from data element 101 to component $Cd_v$ 147.

Method 200 includes indirectly incrementally calculating w (w=p−v) components as needed (216), i.e., only when not all p components are directly incrementally calculated (e.g., as depicted in FIG. 1B) and an autocorrelation is accessed.

Method 200 includes calculating autocorrelation on a needed basis: when an autocorrelations function is accessed, autocorrelations at the specified lag l will be calculated; else only the v components will be directly incrementally calculated for every data change in the computation window. Method 200 includes indirectly incrementally calculating each of w (w=p−v) components one by one as needed by using one or more components at the given lag other than the component itself (215), calculating autocorrelation at the given lag using one or more components at the given lag (216).

204-210 may be repeated as newer streamed data elements are accessed or received. 215-216 may be repeated as needed when an autocorrelation is accessed. For example, subsequent to calculating component $Cd_1$ 143 and component $Cd_v$ 147 at the specified lag l, data element 102 may be accessed or received.

Method 200 includes accessing or receiving a new Big Data or streamed data element subsequent to accessing or receiving the one Big Data or streamed data element (204); storing the new data element into a data buffer (205); updating the computation window by adding the newly accessed or received data element to the computation window, adjusting the computation window size counter by increasing its value by 1 (206). For example, data element 102 may be accessed or received subsequent to accessing or receiving data elements 101, and data element 102 may be stored into data buffer 121, and data element 102 will be added to the computation window and computation window size counter 118 will be adjusted by increasing its value by 1 when data element 102 is accessed or received.

Method 200 includes directly incrementally calculating v components of a next autocorrelation at a given lag (l ($1 \le l < n$)) for the adjusted computation window by using the v components of the autocorrelation for the prior computation window (207). For example, at a given lag, incremental algorithm 133 may be used for directly incrementally calculating component $Cd_1$ 144 by using component $Cd_1$ 143, and similarly incremental algorithm 139 may be used for directly incrementally calculating component $Cd_v$ 148 by using component $Cd_v$ 147.

Directly incrementally calculating the v components of a next autocorrelation at the given lag l includes accessing l data elements from each side of the computation window plus the data element newly added to the computation window (208). For example, incremental algorithm 133 may access data element in location 121A, data element in location 121C (i.e., data element 101) plus data element 102 when calculating v components at lag l=1. Similarly, incremental algorithm 139 may access data element in location 121A, data element in location 121C (i.e., data element 101) plus data element 102 when calculating v components at lag l=1.

Directly incrementally calculating the v components of a next autocorrelation at the given lag l includes accessing each of the v components of the autocorrelation at the given lag l in the previous computation window (209). For example, incremental algorithm 133 may access component $Cd_1$ 143 at the given lag. Similarly, incremental algorithm 139 may access component $Cd_v$ 147 at the given lag.

Directly incrementally calculating the v components of an autocorrelation at a given lag l includes mathematically adding a contribution of the new data element added to the computation window to each of the v components at the given lag (210). For example, directly incrementally calculating component $Cd_1$ 144 at lag l=5 may include contribution addition module 133A mathematically adding contribution 153 to component 143 at lag l=5, and incrementally calculating component $Cd_v$ 148 at lag l=5 may include contribution addition module 139A mathematically adding contribution 183 to component $Cd_v$ 147 at lag l=5. Contribution 153 and 183 are contributions from data element 102.

As depicted in FIGS. 1A and 1B, at a given lag l, component $Cd_1$ 144 includes contribution 151 (a contribution from initialization, i.e., contribution from data elements in 121A and 121B), contribution 152 (a contribution from data element 101), and contribution 153 (a contribution from data element 102). Similarly, component $Cd_v$ 148 includes contribution 181 (a contribution from initialization, i.e., contribution from data elements in 121A and 121B), contribution 182 (a contribution from data element 101), and contribution 183 (a contribution from data element 102).

Method 200 includes steps which are executed depending on whether an autocorrelation is accessed. If not, method includes accessing or receiving a new data element and starting calculation for next computation window (204). If yes, method 200 includes indirectly incrementally calculating w (w=p−v) components at the given lag l as needed (215), and calculating autocorrelation at the given lag using one or more components at the given lag (216). For example, in architecture 100A where all components are directly incrementally calculated, autocorrelation calculation module 192 may calculate autocorrelation 193 at the given lag l by using one or more of the directly incrementally calculated v components. In architecture 100B where v components being directly incrementally calculated and w components being indirectly incrementally calculated, component calculation module 135 may indirectly incrementally calculate w components (from component $Ci_1$ to component $Ci_w$) at the given lag, and then autocorrelation calculation module 192 may calculate autocorrelation 193 at the given lag using one or more incrementally calculated components.

When a next new streaming data element is accessed or received, component $Cd_1$ 144 may be used for directly incrementally calculating a next component $Cd_1$ and component $Cd_v$ 148 may be used for directly incrementally calculating a next component $Cd_v$.

As depicted, reset 219 may be used for resetting incremental autocorrelation calculation. When reset 219 is invoked either after 211 or 216, the computation window size counter and v (1≤v≤p) components of autocorrelations at the given lag l will be initialized. For example, component $Cd_1$ 141 may be initialized according to its definition using data elements in the computation window or initialized as zero when the computation window size counter is reset to zero or a specific value if the value has already been calculated when the computation window size counter is non-zero. The latter case may happen when combining incremental autocorrelation calculation with iterative autocorrelation calculation or decremental autocorrelation calculation. Component $Cd_v$ 145 may be initialized in the same way.

Figure 3A:
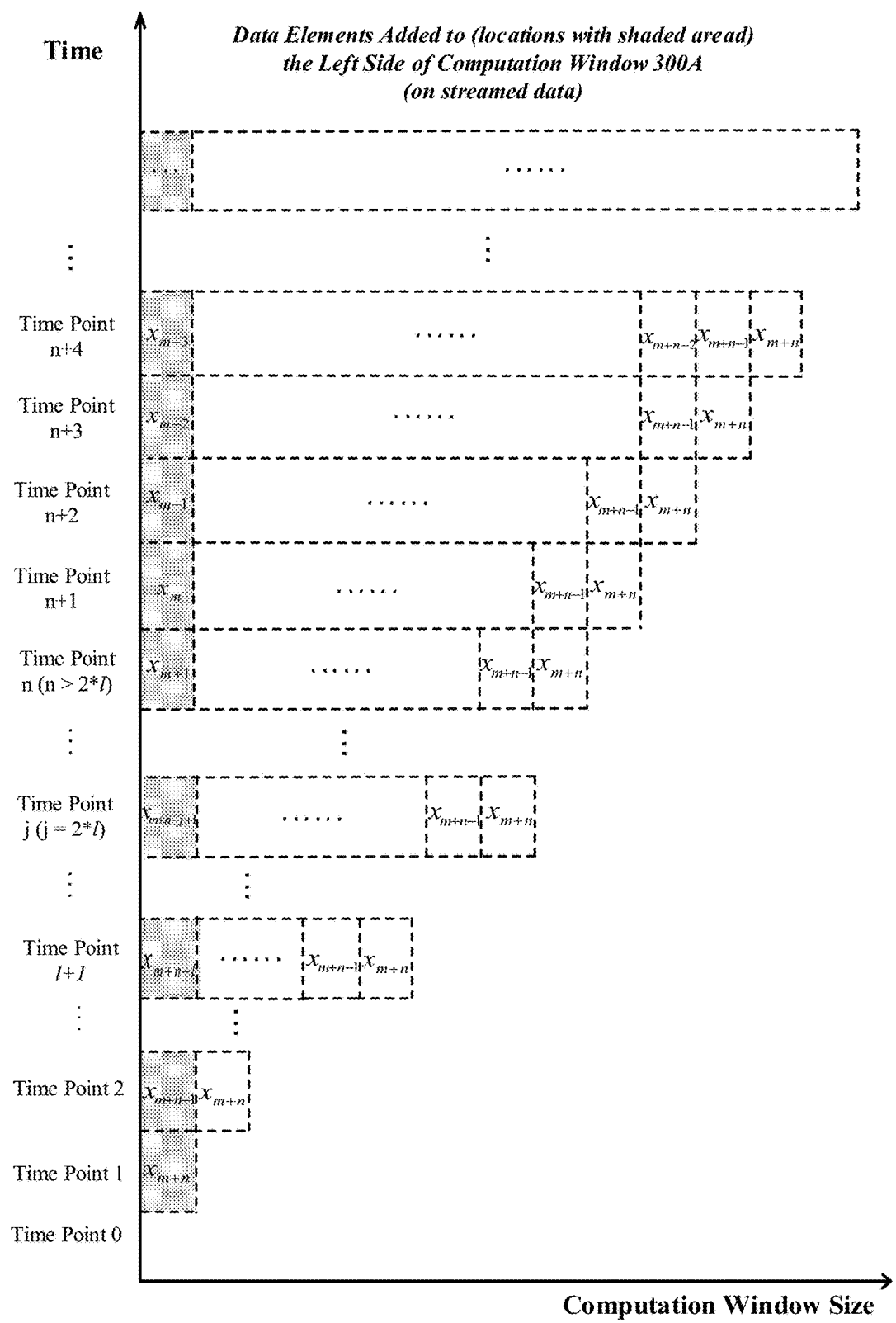
FIG. 3A illustrates data that is added to the left side of a computation window 300A for incrementally calculating an autocorrelation.

FIG. 3A illustrates data that is added to the left side of computation window 300A for incrementally calculating autocorrelations at a specified lag on streamed data. Computation window 300A may be either empty from very beginning or non-empty where v (1≤v≤p) components may have already been calculated. As time progresses, least recent data elements, for example, $x_{m+n}$, then $x_{m+n-1}$, then, $x_{m+n-2}$, . . . are added to the left side of computation window 300A respectively.

Figure 3B:
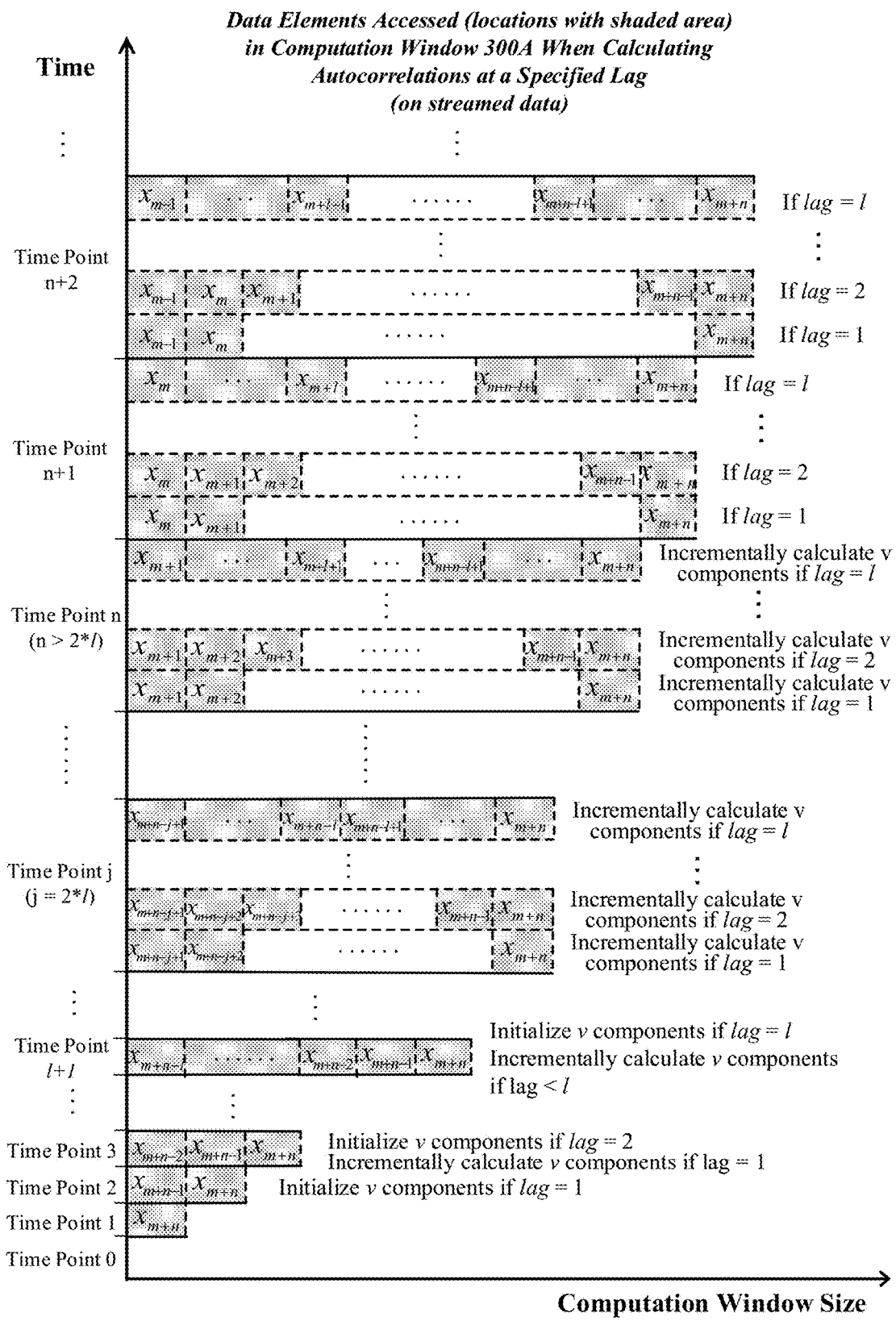
FIG. 3B illustrates data that are accessed from a computation window 300A for incrementally calculating autocorrelations at a specified lag when the data elements outside of the computation window but next to the left end of the computation window are added to the left side of computation window 300A.

FIG. 3B illustrates data that are accessed from computation window 300A for directly incrementally calculating v components at a specified lag on streamed data. When 300A is empty, the computing system may just keep adding data elements to 300A until the number of data elements reaches l+1 where l (l>0) is a specified lag, then one or more (v (1≤v≤p, p≥1) may be initialized by using the data elements in computation window 300A. When 300A is non-empty, v components may have already been calculated. If not, v components may be initialized by using the data elements in 300A if the number of data elements in 300A is equal to or larger than l+1. As depicted in FIG. 3B, at time point 0, computation window 300A is empty. At time point 1, computation window 300A is added a data element, and the computing system may just adding data elements to 300A and adjusting the window size counter. At time point 2, computation window 300A contains 2 data elements, and v components at l=1 may be initialized if l=1. At time point 3, computation window 300A contains 3 data elements, and v components at l=2 may be initialized if lag l=2, and v components at l=1 may be incrementally calculated if lag l=1 and the v components at l=1 have been initialized . . . . If the specified lag is l, the v components may be initialized when the number of data elements in 300A is equal to or more than l+1. The v components may be directly incrementally calculated when the number of data elements in 300A is more than l+1. All data elements in 300A will be used before the number of data elements in 300A is more than 2*l. The v components at a specified lag l (1≤l<n) may be directly incrementally calculated from l data elements from each side of the computation window respectively plus the newly added data element and the v components at lag l for the previous computation window. For example, if l=1, 1 data elements from left side and 1 data element from the right side of computation window 300A plus the newly added data element are received, and if l=2, 2 data elements from left side and 2 data elements from the right side of computation window 300A plus the newly added data element are received, . . . , and if lag l=l, 1 data elements from the left side and 1 data elements from the right side of computation window 300A plus newly added data element are received. Thus, the computation workload for calculating v components at a specified lag l for a given computation window is reduced. The number of operations for indirectly incrementally calculating w=p−v components and an autocorrelation at a specified lag l is also constant. Thus, the overall computation workload of incrementally calculating an autocorrelation is reduced. The larger the n, the more substantial the reduction in computation workload.

Figure 3C:
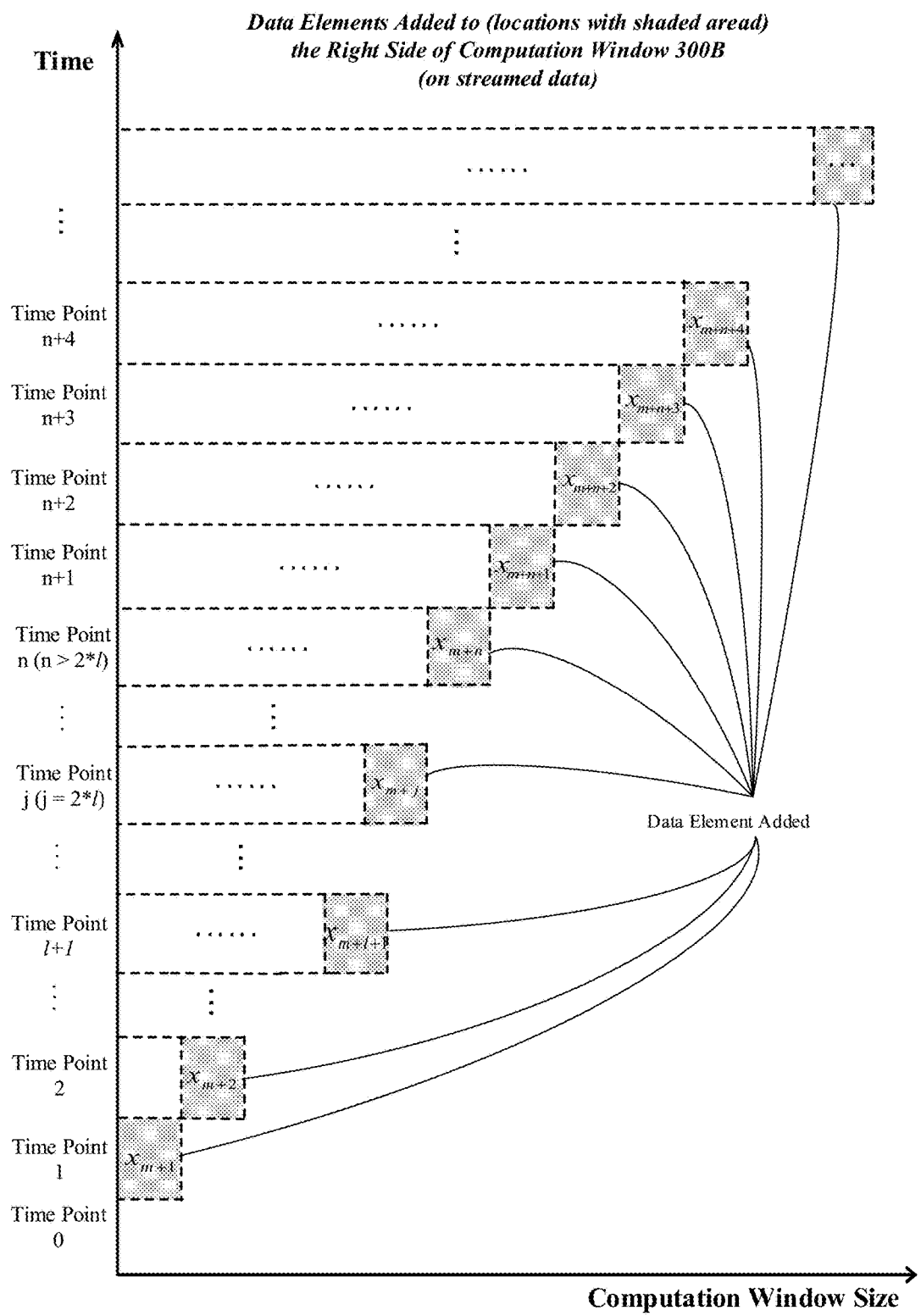
FIG. 3C illustrates data that is added to the right side of a computation window 300B for incrementally calculating an autocorrelation.

FIG. 3C illustrates data that is added to the right side of computation window 300B for incrementally calculating autocorrelations at a specified lag on streamed data. Computation window 300B may be either empty from very beginning or non-empty where v (1≤v≤p) components may have already been calculated. As time progresses, most recent data elements, for example, $x_{m+1}$, then $x_{m+2}$, . . . , then $x_{m+n}$, then $x_{m+n+1}$, then, $x_{m+n+2}$, . . . are added to the right side of computation window 300B.

Figure 3D:
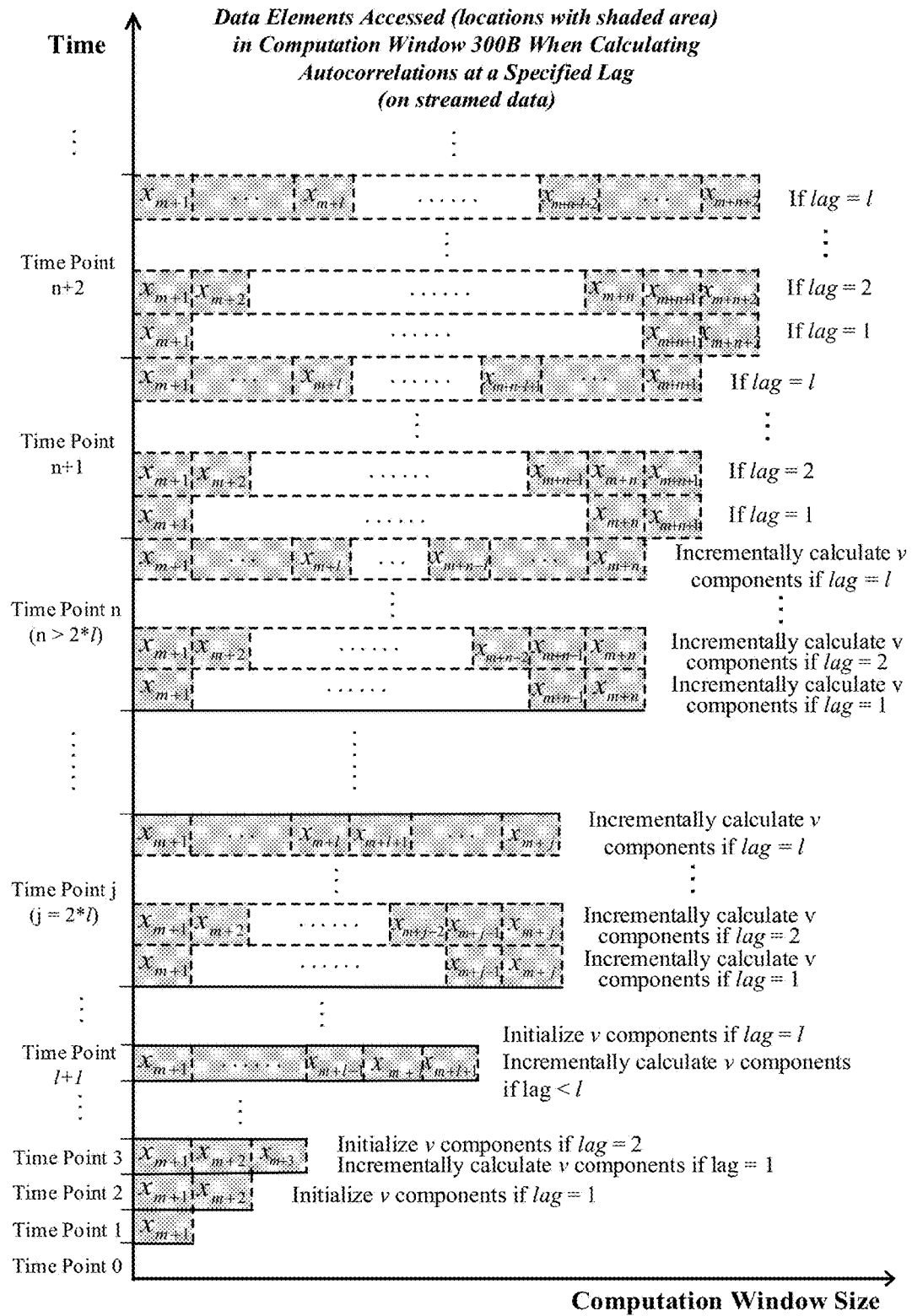
FIG. 3D illustrates data that are accessed from a computation window 300B for incrementally calculating autocorrelations at a specified lag when the data elements outside of the computation window but next to the right end of the computation window are added to the right side of computation window 300B.

FIG. 3D illustrates data that are accessed from computation window 300B for directly incrementally calculating next v components at a specified lag on streamed data. When 300B is empty, the computing system may just keep adding data elements to 300B until the number of data elements reaches l+1 where l (l>0) is a specified lag, then one or more (v (1≤v≤p, p≥1) may be initialized by using the data elements in computation window 300B. When 300B is non-empty, v components may have already been calculated. If not, v components may be initialized by using the data elements in 300B if the number of data elements in 300B is equal to or larger than l+1. As depicted in FIG. 3D, at time point 0, computation window 300B is empty. At time point 1, computation window 300B is added a data element, and the computation system may adjust the computation window size counter. At time point 2, computation window 300B contains 2 data elements, and v components at l=1 may be initialized. At time point 3, computation window 300B contains 3 data elements, and v components at l=2 may be initialized if lag l=2, and v components at l=1 may be incrementally calculated if lag l=1 and the v components at l=1 have been initialized . . . . If the specified lag is l, the v components may be initialized when the number of data elements in 300B is equal to or more than l+1. The v components may be directly incrementally calculated when the number of data elements in 300B is more than l+1. All data elements in 300B will be used before the number of data elements in 300B is more than 2*l. The v components at lag l may be directly incrementally calculated from l data elements from each side of the computation window plus the newly added data element and the v components at lag l for the previous computation window. For example, if l=1, 1 data element from left side and 1 data element from the right side of computation window 300B plus the newly added data element are received, and if l=2, 2 data elements from left side and 2 data elements from the right side of computation window 300B plus the newly added data element are received, . . . , and if l=l, 1 data elements from the left side and 1 data elements from the right side of computation window 300B plus the newly received or received data element are received. Thus, the computation workload for calculating v components at lag l for a given computation window is reduced. The number of operations for indirectly incrementally calculating w=p−v components and an autocorrelation at a specified lag is also constant. Thus, the overall computation workload of incrementally calculating an autocorrelation is reduced. The larger the n, the more substantial the reduction in computation workload.

FIG. 4A illustrates the definition of autocorrelation. Suppose a computation window $X=\{x_i|i=m+1, \ldots, m+n\}$ is a window of a Big Data set or streamed data which contains the data elements to be involved in autocorrelation calculation. Suppose X has changed after some time period, say a new data element $x_a$ is added to computation window X. Whenever a data element is added, the computation window is considered as a new computation window. A new iteration of calculation is started each time any component of an autocorrelation is recalculated due to a data change in the computation window. The computing results of an autocorrelation is related to not only the value of each data element in the computation window but also the sequential order of each data element, so it should be handled differently when adding a data element to different positions within the computation window. There are three different cases:

1. adding a new data element $x_a$ to the left most position of the computation window;
2. adding a new data element $x_a$ to the right most position of the computation window;
3. adding a new data element $x_a$ to any position within the computation window but not at either end.

The $3^{rd}$ case rarely happens in time series data, so let's take the first two cases into consideration.

The equations for calcualting one or more components for those two cases might be different. To distinguish them, define the adjusted computation window as $X^I$ for the former case and $X^{II}$ for the latter case. There is no difference between the equations for calculating a sum or a mean on $X^I$ and $X^{II}$, so do not distinguish the symbols for sum and mean for the two cases. Equation 401 is a traditional equation for calculating a sum $S_k$ of all the data elements in X. Equation 402 is a traditional equation for calculating a mean $\bar{x}_k$ of all the data elements in X. Equation 403 is a traditional equation for calculating an autocorrelation $\rho_{(k,l)}$ with a lag l of all the data elements in a computation window of size n. Equation 404 is a traditional equation for calculating a sum $S_{k+1}$ of all the data elements in the adjusted computation window $X^I$. Equation 405 is a traditional equation for calculating a mean $\bar{x}_{k+1}$ of all the data elements in the adjusted computation window $X^I$. Equation 406 is a traditional equation for calculating an autocorrelation $\rho^I_{(k+1,l)}$ of all the data elements in the adjusted computation window $X^I$. As stated earlier, when adding a new data element $x_a$ to the right most position of the computation window, the adjusted computation window is defined as $X^{II}$. Equation 407 is a traditional equation for calculating an autocorrelation $\rho^{II}_{(k+1,l)}$ of all the data elements in the adjusted computation window $X^{II}$.

FIG. 4B illustrates some components of an autocorrelation and basic incremental component calculation equations. A component of an autocorrelation is a quantity or expression appearing in the autocorrelation's definition equation or any transforms of the definition equation. The following are some example components of an autocorrelation.

$$S_k = \sum_1^n x_i$$

$$\bar{x}_k = \frac{1}{n}\sum_1^n x_i$$

$$SS_k = \sum_1^n x_i^2$$

$$SX_k = \sum_1^n (x_i - \bar{x}_k)^2$$

$$\text{cov} X_{(k,l)} = \sum_{1+l}^n (x_i - \bar{x}_k)(x_{i-l} - \bar{x}_k) (l \text{ is the lag})$$

An autocorrelation may be calculated based on one or more components or combinations of them, so there are multiple algorithms supporting incremental autocorrelation calculation. To illustrate how to use components to incrementally calculate autocorrelation, three different incremental autocorrelation calculation algorithms are given as examples. A new iteration of calculation is started each time any component of an autocorrelation is recalculated due to a data change in the computation window. A sum or a mean is the basic component to be used for calculating an autocorrelation. The equations for incrementally calculating a sum or a mean are basic incremental component equations which will be used by all example incremental autocorrelation calculation algorithms, therefore they are presented in FIG. 4B instead of each example incremental autocorrelation calculation algorithm. Equation 408 is an equation for incrementally calculating a sum $S_{k+1}$ of all the data elements in the adjusted computation window $X^I$ or $X^{II}$ by mathematically adding a contribution of the added data element to the computation window to the previous sum. Equation 409 is an equation for incrementally calculating a mean $\bar{x}_{k+1}$ of all the data elements in the adjusted computation window $X^I$ or $X^{II}$ by mathematically adding a contribution of the added data element to computation window to the previous mean. Either a sum or a mean will be used in all three incremental autocorrelation calculation algorithms described later.

FIG. 4C illustrates the first example incremental autocorrelation calculation algorithm (incremental algorithm 1). As depicted in FIG. 4C, when adding a new data element $x_a$ to the left most position of the computation window, incremental algorithm 1 comprises incremental calculation of components $S_{k+1}$ or $\bar{x}_{k+1}$, $SS_{k+1}$, $SX_{k+1}$, and cov $X^I_{(k+1,l)}$, and an autocorrelation $\rho^I_{(k+1,l)}$ may be calculated by using components $SX_{k+1}$ and cov $X^I_{(k+1,l)}$ once they are calculated. Equation 408 may be used for directly incrementally calculating component $S_{k+1}$ if component $S_k$ is available. Equation 409 may be used for directly incrementally calculating component $\bar{x}_{k+1}$ if component $\bar{x}_k$ is available. Equation 410 is a traditional equation for calculating component $SS_k$ in the computation window X. Equation 411 is a traditional equation for calculating component $SS_{k+1}$ in the adjusted computation window $X^I$. Equation 412 may be used for directly incrementally calculating component $SS_{k+1}$ in the adjusted computation window $X^I$ if component $SS_k$ is available. Equation 413 is a traditional equation for calculating component $SX_k$ in the computation window X. Equation 414 is a traditional equation for calculating component $SX_{k+1}$ in the adjusted computation window $X^I$. Equations 415 may be used for indirectly incrementally calculating component $SX_{k+1}$ in the adjusted computation window $X^I$ if components $S_{k+1}$ or $\bar{x}_{k+1}$ and $SS_{k+1}$ are available. Equations 415 comprise multiple equations but only one of them is needed depending on if a sum or a mean or both are available. Equation 416 is a traditional equation for calculating component cov $X_{(k,l)}$ in the computation window X. Equation 417 is a traditional equation for calculating component cov $X^I_{(k+1,l)}$ in the adjusted computation window $X^I$. Equations 418 may be used for indirectly incrementally calculating component cov $X^I_{(k+1,l)}$ in the adjusted computation window $X^I$ if components cov $X_{(k,l)}$, $SS_{k+1}$, $S_k$ or $\bar{x}_k$ and $S_{k+1}$ or $\bar{x}_{k+1}$ are available. Equations 418 comprise multiple equations but only one of them is needed depending on if a sum or a mean or both are available. Equation 419 may be used for calculating the autocorrelation $\rho^I_{(k+1,l)}$ at a given lag l for the adjusted computation window $X^I$ using components cov $X^I_{(k+1,l)}$ and $SX_{k+1}$ once they are calculated. When adding a new data element $x_a$ to the right most position of the computation window, incremental algorithm 1 comprises incremental calculation of components $S_{k+1}$ or $\bar{x}_{k+1}$, $SS_{k+1}$, $SX_{k+1}$, and cov $X^{II}_{(k+1,l)}$, and an autocorrelation $\rho^{II}_{(k+1,l)}$ may be calculated by using components $SX_{k+1}$ and cov $X^{II}_{(k+1,l)}$ once they are calculated. Equation 408 may be used for directly incrementally calculating component $S_{k+1}$ if component $S_k$ is available. Equation 409 may be used for directly incrementally calculating component $\bar{x}_{k+1}$ if component $\bar{x}_k$ is available. Equation 410 is a traditional equation for calculating component $SS_k$ in the computation window X. Equation 411 is a traditional equation for calculating component $SS_{k+1}$ in the adjusted computation window $X^{II}$. Equation 412 may be used for directly incrementally calculating component $SS_{k+1}$ in the adjusted computation window $X^{II}$ if component $SS_k$ is available. Equation 413 is a traditional equation for calculating component $SX_k$ in the computation window X. Equation 414 is a traditional equation for calculating component $SX_{k+1}$ in the adjusted computation window $X^{II}$. Equations 415 may be used for indirectly incrementally calculating component $SX_{k+1}$ in the adjusted computation window $X^{II}$ if components $S_{k+1}$ and/or $\bar{x}_{k+1}$ and $SS_{k+1}$ are available. Equations 415 comprise multiple equations but only one of them is needed depending on if a sum or a mean or both are available. Equation 416 is a traditional equation for calculating component cov $X_{(k,l)}$ in the computation window X. Equation 420 is a traditional equation for calculating component cov $X^{II}_{(k+1,l)}$ in the adjusted computation window $X^{II}$. Equations 421 may be used for directly incrementally calculating component cov $X^{II}_{(k+1,l)}$ in the adjusted computation window $X^{II}$ if components cov $X_{(k,l)}$, $SS_{k+1}$, $S_k$ or $\bar{x}_k$ and $S_{k+1}$ or $\bar{x}_{k+1}$ are available. Equations 421 comprise multiple equations but only one of them is needed depending on if a sum or a mean or both are available. Equation 422 may be used for calculating the autocorrelation $\rho^{II}_{(k+1,l)}$ at a given lag l for the adjusted computation window $X^{II}$ using components cov $X^{II}_{(k+1,l)}$ and $SX_{k+1}$ once they are calculated.

FIG. 4D illustrates the second example incremental autocorrelation calculation algorithm (incremental algorithm 2). As depicted in FIG. 4D, when adding a new data element $x_a$ to the left most position of the computation window, incremental algorithm 2 comprises incremental calculation of components $S_{k+1}$ or $\bar{x}_{k+1}$, $SX_{k+1}$, and cov $X^I_{(k+l,1)}$, and an autocorrelation may be calculated by using components $SX_{k+1}$ and cov $X^I_{(k+1,l)}$ once they are calculated. Equation 408 may be used for directly incrementally calculating component $S_{k+1}$ if component $S_k$ is available. Equation 409 may be used for directly incrementally calculating component $\bar{x}_{k+1}$ if component $\bar{x}_k$ is available. Equation 423 is a traditional equation for calculating component $SX_k$ in the computation window X. Equation 424 is a traditional equation for calculating component $SX_{k+1}$ in the adjusted computation window $X^I$. Equations 425 may be used for directly incrementally calculating component $SX_{k+1}$ in the adjusted computation window $X^I$ if components $SX_k$, $S_{k+1}$ and/or $\bar{x}_{k+1}$ are available. Equations 425 comprise multiple equations but only one of them is needed depending on if a sum or a mean or both are available. Equation 426 is a traditional equation for calculating component cov $X_{(k,l)}$ in the computation window X. Equation 427 is a traditional equation for calculating component cov $X^I_{(k+1,l)}$ in the adjusted computation window $X^I$. Equations 428 may be used for directly incrementally calculating component cov $X^I_{(k+1,l)}$ in the adjusted computation window $X^I$ if components cov $X_{(k,l)}$, $S_k$ or $\bar{x}_k$ and $S_{k+1}$ or $\bar{x}_{k+1}$ are available. Equations 428 comprise multiple equations but only one of them is needed depending on if a sum or a mean or both are available. Equation 429 may be used for calculating the autocorrelation $\rho^I_{(k+1,l)}$ for the adjusted computation window $X^I$ once cov $X^I_{(k+1,l)}$ and $SX_{k+1}$ are calculated. As depicted in FIG. 4D, when adding a new data element $x_a$ to the right most position of the computation window, incremental algorithm 2 comprises incremental calculation of components $S_{k+1}$ or $\bar{x}_{k+1}$, $SX_{k+1}$, and cov $X^{II}_{(k+1,l)}$, and an autocorrelation may be directly calculated by using $SX_{k+1}$ and cov $X^{II}_{(k+1,l)}$ once they are calculated. Equation 408 may be used for directly incrementally calculating component $S_{k+1}$ if component $S_k$ is available. Equation 409 may be used for directly incrementally calculating component $\bar{x}_{k+1}$ if component $\bar{x}_k$ is available. Equation 423 is a traditional equation for calculating $SX_k$ in the computation window X. Equation 424 is a traditional equation for calculating component $SX_{k+1}$ in the adjusted computation window $X^{II}$. Equations 425 may be used for directly incrementally calculating component $SX_{k+1}$ in the adjusted computation window $X^{II}$ if components $SX_k$, $S_{k+1}$ and/or $\bar{x}_{k+1}$ are available. Equations 425 comprise multiple equations but only one of them is needed depending on if a sum or a mean or both are available. Equation 426 is a traditional equation for calculating component cov $X_{(k,l)}$ in the computation window X. Equation 430 is a traditional equation for calculating component cov $X^{II}_{(k+1,l)}$ in the adjusted computation window $X^{II}$. Equations 431 may be used for directly incrementally calculating component cov $X^{II}_{(k+1,l)}$ in the adjusted computation window $X^{II}$ if components cov $X_{(k,l)}$, $S_k$ or $\bar{x}_k$ and $S_{k+1}$ or $\bar{x}_{k+1}$ are available. Equations 431 comprise multiple equations but only one of them is needed depending on if a sum or a mean or both are available. Equation 432 may be used for calculating the autocorrelation $\rho^{II}_{(k+1,l)}$ for the adjusted computation window $X^{II}$ once components cov $X^{II}_{(k+1,l)}$ and $SX_{k+1}$ are calculated.

FIG. 4E illustrates the third example incremental autocorrelation calculation algorithm (incremental algorithm 3). As depicted in FIG. 4E, when adding a new data element $x_a$ to the left most position of the computation window, incremental algorithm 3 comprises incremental calculation of components $S_{k+1}$ or $\bar{x}_{k+1}$, $SX_{k+1}$, and cov $X^I_{(k+1,l)}$, and an autocorrelation may be calculated by using components $SX_{k+1}$ and cov $X^I_{(k+1,l)}$, once they are calculated. Equation 408 may be used for directly incrementally calculating component $S_{k+1}$ if component $S_k$ is available. Equation 409 may be used for directly incrementally calculating component $\bar{x}_{k+1}$ if component $\bar{x}_k$ is available. Equation 433 is a traditional equation for calculating component $SX_k$ in the computation window X. Equation 434 is a traditional equation for calculating component $SX_{k+1}$ in the adjusted computation window $X^I$. Equations 435 may be used for directly incrementally calculating component $SX_{k+1}$ in the adjusted computation window $X^I$ if components $SX_k$ or $\bar{x}_k$ and $S_{k+1}$ or $\bar{x}_{k+1}$ are available. Equations 435 comprise multiple equations but only one of them is needed depending on if a sum or a mean is available. Equation 436 is a traditional equation for calculating component cov $X_{(k,l)}$ in the computation window X. Equation 437 is a traditional equation for calculating component cov $X^I_{(k+1,l)}$ in the adjusted computation window $X^I$. Equations 438 may be used for directly incrementally calculating component cov $X^I_{(k+1,l)}$ in the adjusted computation window $X^I$ if components cov $X_{(k,l)}$, $S_k$ or $\bar{x}_k$ and $S_{k+1}$ or $\bar{x}_{k+1}$ are available. Equations 438 comprise multiple equations but only one of them is needed depending on if a sum or a mean is available. Equation 439 may be used for calculating the autocorrelation for the adjusted computation window $X^I$ once components cov $X^I_{(k+1,l)}$ and $SX_{k+1}$ are calculated. As depicted in FIG. 4E, when adding a new data element $x_a$ to the right most position of the computation window, incremental algorithm 3 comprises incremental calculation of components $S_{k+1}$ or $\bar{x}_{k+1}$, $SX_{k+1}$, and cov $X^{II}_{(k+1,l)}$, and an autocorrelation $\rho^I_{(k+1,l)}$ may be calculated by using components $SX_{k+1}$ and cov $X^{II}_{(k+1,l)}$, once they are calculated. Equation 408 may be used for directly incrementally calculating component $S_{k+1}$ if component $S_k$ is available. Equation 409 may be used for directly incrementally calculating component $\bar{x}_{k+1}$ if component $\bar{x}_k$ is available. Equation 433 is a traditional equation for calculating component $SX_k$ in the computation window X. Equation 434 is a traditional equation for calculating component $SX_{k+1}$ in the adjusted computation window $X^{II}$. Equations 435 may be used for directly incrementally calculating component $SX_{k+1}$ in the adjusted computation window $X^{II}$ if components $SX_k$, $S_k$ and/or $\bar{x}_k$, and $S_{k+1}$ and/or $\bar{x}_{k+1}$ are available. Equations 435 comprise multiple equations but only one of them is needed depending on if a sum or a mean or both are available. Equation 436 is a traditional equation for calculating component cov $X_{(k,l)}$ in the computation window X. Equation 440 is a traditional equation for calculating component cov $X^{II}_{(k+1,l)}$ in the adjusted computation window $X^{II}$. Equations 441 may be used for directly incrementally calculating component cov $X^{II}_{(k+1,l)}$ in the adjusted computation window $X^{II}$ if components cov $X_{(k,l)}$, $S_k$ or $\bar{x}_k$ and $S_{k+1}$ or $\bar{x}_{k+1}$ are available. Equations 441 comprise multiple equations but only one of them is needed depending on if a sum or a mean is available. Equation 442 may be used for calculating the autocorrelation $\rho^{II}_{(k+1,l)}$ for the adjusted computation window $X^{II}$ once components cov $X^{II}_{(k+1,l)}$ and $SX_{k+1}$ are calculated.

To demonstrate incremental autocorrelation calculation algorithms and their comparison against traditional algorithms, three examples are given below. Three computation windows of data elements are used. For traditional algorithms, the calculations for all three computation windows are exactly the same. For incremental algorithms, initialization of one or more components is performed for the first computation window, and incremental calculations are performed for the second and third computation windows.

FIG. 5A illustrates an example of calculating an autocorrelation at lag l=1 for Big Data Set 501 using traditional algorithms. Big Data Set 501 is either a Big Data set or streamed data. The example assumes a new data element $x_a$ is added to the right most position of the computation window. Computation window 502 includes the first four data elements in Big Data Set 501. Computation window size 503 (n) is 4. There are a total of 2 divisions, 7 multiplications, 8 additions, 10 subtractions when calculating the autocorrelation on 4 data elements without any optimization.

The same equations may be used to calculate the autocorrelation at lag=1 for computation window 504 as shown in FIG. 5A Cont'd 1, however the computation window size 505 is increased to 5. The calculation includes a total of 2 divisions, 9 multiplications, 11 additions, 13 subtractions when calculating the autocorrelation on 5 data elements without any optimization.

The same equations may also be used to calculate the autocorrelation for computation window 506 as shown in FIG. 5A Cont'd 2, however the computation window size 507 is increased to 6. The calculation includes a total of 2 divisions, 11 multiplications, 14 additions, 16 subtractions when calculating the autocorrelation on 6 data elements without any optimization. Traditional algorithms for calculating autocorrelation at a given lag l on n data elements typically take 2 divisions, 2n–1 multiplications, 3n–(l+3) additions, and 3n–2l subtractions without any optimization.

FIG. 5B illustrates an example of calculating an autocorrelation at lag l=1 using incremental algorithm 1. The example assumes a new data element $x_a$ is added to the right most position of the computation window, and a mean instead of a sum is used in the example. The calculations for computation window 502 uses traditional equations to calculate the initial values of components $\bar{x}_1$, $SS_1$, $SX_1$, and cov $X_{(1,1)}$. The autocorrelation of computation window 502 is then calculated by using those components. In practice, such calculation will not happen, because incremental autocorrelation calculation would either start from computation window is empty or where those components have already been calculated when the computation window is not empty. Using traditional algorithms to calculate those components on this non-empty computation window here is only for the purpose of illustrating the incremental algorithm. Equation 402 is used for calculating component $\bar{x}_1$. Equation 410 is used for calculating component $SS_1$. Equation 413 is used for calculating component $SX_1$. Equation 416 is used for calculating component cov $X_{(1,1)}$ and cov $X_{(1,2)}$ respectively. Equation 403 is used for calculating component $\rho_{(1,1)}$ and $\rho_{(1,2)}$ respectively. The autocorrelation at lag l=1 $\rho_{(1,1)}$ for computation window 502 is calculated by using cov $X_{(1,1)}$ and $SX_1$. There are a total of 2 divisions, 9 multiplications, 8 additions and 7 subtractions when calculating the autocorrelation at lag l=1 on a computation window of size 4.

However, starting from computation window 504, the components of the autocorrelation at lag l=1 for computation window 504 may be incrementally calculated from the components of the autocorrelation for computation window 502. For example, equation 409 may be used for incrementally calculating the component $\bar{x}_2$ by using $\bar{x}_1$ previously calculated for computation window 502. Equation 412 may be used for incrementally calculating the component $SS_2$ by using $SS_1$ previously calculated for computation window 502. Equation 415 may be used for incrementally calculating the component $SX_2$ by using $SS_2$ and $\bar{x}_2$. Equation 421 may be used for incrementally calculating the component c cov $X^{II}_{(2,1)}$ (lag l=1) by using $\bar{x}_1$ and cov $X_{(1,1)}$ (lag l=1) previously calculated for computation window 502 and $\bar{x}_2$. Equation 422 may be used for calculating the autocorrelation $\rho^{II}_{(2,1)}$ at lag l=1 by using cov $X^{II}_{(2,1)}$ and $SX_2$. There are a total of 2 divisions, 8 multiplications, 7 additions and 6 subtractions when calculating the autocorrelation at lag l=1 on a computation window of size 5.

The same equations may also be used for incrementally calculating the components of autocorrelation at lag l=1 for computation window 506 from the components of autocorrelation for computation window 504. The computation window size 507 is increased to 6. Although the computation window size is increased, the number of operations performed by the incremental algorithm remains constant. There are also a total of 2 divisions, 8 multiplications, 7 additions and 6 subtractions when incrementally calculating the autocorrelation on a computation window of size 6. As such, since the number of operations performed by the incremental algorithm is fixed and not changing with the computation window size, starting from computation window 504, the number of operations used when incrementally calculating the autocorrelation is (potentially substantially) less than when using traditional equations for computation windows with a large size.

FIG. 5C illustrates an example of calculating autocorrelation using incremental algorithm 2. The example assumes a new data element $x_a$ is added to the right most position of the computation window, and a mean instead of a sum is used in the example. The calculations of calculating an autocorrelation for computation window 502 uses traditional equations to calculate the initial values of components $\bar{x}_1$, $SX_1$, and cov $X_{(1,1)}$. In practice, such calculation will not happen, because incremental autocorrelation calculation would either start from computation window is empty or where those components have already been calculated when the computation window is not empty. Using traditional algorithms to calculate those components on this non-empty computation window here is only for the purpose of illustrating the incremental algorithm. For example, equation 402 may be used for calculating $\bar{x}_1$. Equation 423 may be used for calculating $SX_1$. Equation 426 may be used for calculating cov $X_{(1,1)}$. The autocorrelation of computation window 502 $\rho_{(1,1)}$ (lag l=1) is then calculated by using those components through equation 403 respectively. There are a total of 2 divisions, 9 multiplications, 8 additions and 7 subtractions when calculating the autocorrelation at lag l=1 on a computation window of size 4.

However, starting from computation window 504, the components of the autocorrelation at lag l=1 for computation window 504 may be incrementally calculated from the components of the autocorrelation for computation window 502. For example, equation 409 may be used for incrementally calculating the component $\bar{x}_2$ by using $\bar{x}_1$ previously calculated for computation window 502. Equation 425 may be used for incrementally calculating the component $SX_2$ by using $SX_1$ and $\bar{x}_2$. Equation 431 may be used for incrementally calculating the component cov $X^{II}_{(2,1)}$ (lag l=1) by using $\bar{x}_1$, $\bar{x}_2$ and cov $X_{(1,1)}$. Equation 432 may then be used for calculating the autocorrelations $\rho^{II}_{(2,1)}$ (lag l=1) by using cov $X^{II}_{(2,1)}$ and $SX_2$. There are a total of 2 divisions, 6 multiplications, 7 additions and 7 subtractions when calculating the autocorrelation at lag l=1 on a computation window of size 5.

The same equations may also be used for incrementally calculating the components of autocorrelation for computation window 506 from the components of autocorrelation for computation window 504. The computation window size 507 is increased to 6. Although the computation window size is increased, the number of operations performed by the incremental algorithm remains constant. There are also a total of 2 divisions, 6 multiplications, 7 additions and 7 subtractions when incrementally calculating the autocorrelation at lag=1 on a computation window of size 6. As such, since the number of operations performed by the incremental algorithm is fixed and not changing with the computation window size, starting from computation window 504, the number of operations used when incrementally calculating the autocorrelation is (potentially substantially) less than when using traditional equations for computation windows with a large size.

FIG. 5D illustrates an example of calculating an autocorrelation at lag l=1 using incremental algorithm 3. The example assumes a new data element $x_a$ is added to the right most position of the computation window, and a mean instead of a sum is used in the example. The calculations for computation window 502 uses traditional equations to calculate the initial values of components $\bar{x}_1$, $SX_1$, and cov $X_{(1,1)}$. In practice, such calculation will not happen, because incremental autocorrelation calculation would either start from computation window is empty or where those components have already been calculated when the computation window is not empty. Using traditional algorithms to calculate those components on this non-empty computation window here is only for the purpose of illustrating the incremental algorithm. For example, equation 402 may be used for calculating $\bar{x}_1$. Equation 433 may be used for calculating $SX_1$. Equation 436 may be used for calculating cov $X_{(1,1)}$. Equation 403 may then be used for calculating the autocorrelations of computation window 502 $\rho_{(1,1)}$ (lag l=1) by using cov $X_{(1,1)}$ and $SX_1$. There are a total of 2 divisions, 9 multiplications, 8 additions and 7 subtractions when calculating the autocorrelation at lag l=1 on a computation window of size 4.

However, starting from window 504, the components of the autocorrelation at lag l=1 for the adjusted computation window (e.g., 504) may be incrementally calculated from the components of the autocorrelation for the previous computation window (e.g., 502). For example, equation 409 may be used for incrementally calculating the component $\bar{x}_2$ by using $\bar{x}_1$ previously calculated for computation window 502. Equation 435 may be used for incrementally calculating the component $SX_2$ by using $SX_1$, $\bar{x}_1$ and $\bar{x}_2$. Equation 441 may be used for incrementally calculating the component cov $X^{II}_{(2,1)}$ by using $\bar{x}_1$, $\bar{x}_2$, and cov $X^{II}_{(1,1)}$. Equation 442 may then be used for calculating the autocorrelations $\rho^{II}_{(2,1)}$ (lag l=1) by using cov $X^{II}_{(2,1)}$ and $SX_2$. There are a total of 2 divisions, 5 multiplications, 7 additions and 7 subtractions when calculating the autocorrelation on a computation window of size 5.

The same equations may also be used for incrementally calculating the components of autocorrelation for computation window 506 from the components of autocorrelation for computation window 504. The computation window size 507 is increased to 6. Although the computation window size is increased, the number of operations performed by the incremental algorithm remains constant. There are also a total of 2 divisions, 5 multiplications, 7 additions and 7 subtractions when incrementally calculating the autocorrelation at lag=1 on a computation window of size 6. As such, since the number of operations performed by the incremental algorithm is fixed and not changing with the computation window size, starting from computation window 504, the number of operations used when incrementally calculating the autocorrelation is (potentially substantially) less than when using traditional equations for computation windows with a large size.

In the three examples above, a mean is used for the incremental autocorrelation calculation. If a sum instead of a mean is used, autocorrelation may also be incrementally calculated though the numbers of operations are different. Also, a new data element $x_a$ is added to the right most position of the computation window in the above three examples. It works in a similar way when the new data element $x_a$ is added to the left most position of the computation window but just use a few different equations.

FIG. 6 illustrates computational loads for traditional algorithms and incremental algorithms at lag l=1 for n=6 for computation window 505. As depicted, the computation loads are roughly at same level for traditional algorithms and incremental algorithms for computation windows of size 6.

FIG. 7 illustrates computational loads for traditional algorithms and incremental algorithms at lag l=1 for n=1,000,000 for any computation window other than the first computation window. As depicted, there are fewer multiplication operations, fewer addition operations, and fewer subtraction operations using any one of the incremental algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for generating an autocorrelation at a specified lag for an adjusted computation window on a computing-device-based computing system which comprises one or more computing devices and one or more storage media, each of the one or more computing devices comprising one or more processors, the method comprising:
    initializing, by the computing-device-based computing system, a lag l ($l>0$), a computation window size counter n ($n>2*l+1$), a sum or a mean or both, and one or more components of an autocorrelation at lag l, other than a sum and a mean, for a pre-adjusted computation window which contains n data elements from a data stream stored in a buffer on at least one of the one or more storage media;
    generating, by the computing-device-based computing system, an autocorrelation at lag l for the pre-adjusted computation window based on one or more of the initialized components;
    accessing or receiving, by the computing-device-based computing system, a data element to be added to the pre-adjusted computation window;
    storing, by the computing-device-based computing system, the accessed or received data element in the buffer;
    adjusting, by the computing-device-based computing system, the pre-adjusted computation window, wherein the adjusting includes adding the received data element to the pre-adjusted computation window and adjusting the computation window size counter by increasing its value by 1;
    incrementally deriving, by the computing-device-based computing system, a sum or a mean or both for the adjusted computation window;
    directly incrementally deriving, by the computing-device-based-computing system and based at least in part on the one or more components of the autocorrelation at lag l other than a sum and a mean for the pre-adjusted computation window, one or more components of an autocorrelation at lag l other than a sum and a mean for the adjusted computation window, wherein the incrementally deriving includes:
        accessing or receiving l data elements not including the added data element from each side of the adjusted computation window respectively without accessing or receiving all data elements in the adjusted computation window to allow the computing-device-based computing system to use less memory;
        accessing each of the one or more components of the autocorrelation at lag l other than a sum and a mean for the pre-adjusted computation window; and
        adding a contribution of the data element added to the pre-adjusted computation window to each of the one or more accessed components based on the added data element and/or the l data elements from each side of the adjusted computation window without using all data elements in the adjusted computation window thereby resulting in faster computation time; and
    generating, by the computing-device-based computing system and based on one or more of the derived components of autocorrelation at lag l, the autocorrelation at lag l for the adjusted computation window.

2. The computing-system-implemented method of claim 1, wherein the generating the autocorrelation further comprises indirectly incrementally deriving, by the computing-device-based computing system, one or more components of the autocorrelation at lag l for the adjusted computation window, wherein the indirectly incrementally deriving the one or more components includes individually calculating each respective one of the one or more components based on one or more components other than the respective one component.

3. The computing-system-implemented method of claim 1, wherein accessing or receiving a data element includes accessing or receiving a plurality of z ($z>1$) data elements, and wherein the method further comprises incrementally performing, for each of the respective z data elements, the storing the received data element, the adjusting the pre-adjusted computation window, the incrementally deriving a sum or a mean or both for the adjusted computation window, the directly incrementally deriving the one or more components for the adjusted computation window, and the generating the autocorrelation at lag l for the adjusted computation window.

4. The computing-system-implemented method of claim 3, wherein the generating the autocorrelation at lag l comprises generating the autocorrelation at lag l for the adjusted computation window only when the autocorrelation is accessed.

5. The computing-system-implemented method of claim 4, wherein the generating the autocorrelation at lag l further comprises indirectly incrementally deriving, by the computing-device-based computing system, one or more components of the autocorrelation at lag l for the adjusted computation window, wherein the indirectly incrementally deriving the one or more components includes individually calculating each respective one of the one or more components based on one or more components other than the respective one component.

6. The computing-system-implemented method of claim 1, wherein accessing or receiving a data element includes accessing or receiving a plurality of z ($z>1$) data elements, and wherein the method further comprises incrementally performing, for each of the respective z data elements, the storing the received data element, the adjusting the pre-adjusted computation window, the incrementally deriving a sum or a mean or both for the adjusted computation window, and the directly incrementally deriving the one or more components for the adjusted computation window.

7. The computing-system-implemented method of claim 1, wherein the storing the accessed or received data element in the buffer includes storing the accessed or received data element in a circular buffer.

8. A computing system, the computing system comprising:
    one or more computing devices;
    each computing device comprising one or more processors;
    one or more storage media comprising a buffer for storing data elements in a computation window of a data stream;
    a computation window size counter which indicates a quantity of data elements in the computation window; and
    one or more calculation modules that, when executed by at least one of the one or more computing devices, determine an autocorrelation at a specified lag for an adjusted computation window, wherein the determination of the autocorrelation includes to:
    a. initialize a lag l ($l>0$), a computation window size counter n ($n>2*l+1$), a sum or a mean, or both, and one or more components of an autocorrelation at lag l, other than a sum and a mean, for a pre-adjusted computation window containing n data elements of a data stream stored in the buffer;
b. generate an autocorrelation at lag l for the pre-adjusted computation window based on one or more of the initialized components;
c. access or receive a data element to be added to the pre-adjusted computation window;
d. store the accessed or received data element to the buffer;
e. adjust the pre-adjusted computation window by adding the accessed or received data element to the pre-adjusted computation window and adjusting the computation window size counter by adding its value by 1;
f. incrementally calculate a sum or a mean or both for the adjusted computation window;
g. directly incrementally calculate one or more components of an autocorrelation at lag l other than a sum and a mean for the adjusted computation window based at least in part on the one or more components of the autocorrelation at lag l other than a sum and a mean for the pre-adjusted computation window, including to add a contribution of the data element added to the pre-adjusted computation window to each of the one or more components of the autocorrelation at lag l other than a sum and a mean respectively without accessing and using all data elements in the adjusted computation window to allow the computing system to use less memory and to result in faster computation time; and
h. generate, based on one or more of the calculated components of the autocorrelation at lag l for the adjusted computation window, the autocorrelation at lag l for the adjusted computation window.

9. The computing system of claim 8, wherein the generation of the autocorrelation at lag l further includes to indirectly incrementally calculate one or more components of the autocorrelation at lag l for the adjusted computation window, wherein indirectly incrementally calculating one or more components includes individually calculating each respective one of the one or more components based on one or more components other than the respective one component.

10. The computing system of claim 8, wherein the one or more calculation modules that, when executed by at least one of the one or more computing devices, perform c, d, e, f, and g multiple times.

11. The computing system of claim 8, wherein the one or more calculation modules that, when executed by at least one of the one or more computing devices, perform c, d, e, f, g, and h multiple times.

12. The computing system of claim 11, wherein the performing h comprises to generate the autocorrelation at lag l for the adjusted computation window only when the autocorrelation is accessed.

13. The computing system of claim 12, wherein the generating the autocorrelation at lag l for the adjusted computation window further comprises to indirectly incrementally calculate one or more components of the autocorrelation at lag l for the adjusted computation window, wherein indirectly incrementally calculating one or more components includes individually calculating each respective one of the one or more components based on one or more components other than the respective one component.

14. A computing system program product for use at a configured computing system that comprises one or more computing devices and one or more storage media, each computing device comprising one or more processors, the computing system program product for implementing a method for generating an autocorrelation at a specified lag for an adjusted computation window, the computing system program product comprising one or more non-transitory computing-device-readable storage media having stored thereon computing-device-executable instructions that, when executed by the configured computing system, cause the configured computing system to perform the method, the method including to:
initialize, by the configured computing system, a lag l (l>0), a computation window size counter n (n>2*l+1), a sum or a mean or both, and one or more components of an autocorrelation at lag l other than a sum and a mean for a pre-adjusted computation window of the specified size n, wherein the pre-adjusted computation window contains n data elements from a data stream stored in a buffer on at least one of the one or more storage media;
generate, by the configured computing system, an autocorrelation at lag l for the pre-adjusted computation window based on one or more of the initialized components;
access or receive, by the configured computing system, a data element to be added to the pre-adjusted computation window;
store, by the configured computing system, the accessed or received data element into the buffer;
adjust, by the configured computing system, the pre-adjusted computation window, by adding the accessed or received data element to the pre-adjusted computation window and adjusting the computation window size counter;
incrementally calculate, by the configured computing system, a sum or a mean or both for the adjusted computation window;
directly incrementally calculate, by the configured computing system, one or more components of an autocorrelation at lag l other than a sum and a mean for the adjusted computation window based at least in part on the one or more components of the autocorrelation at lag l other than a sum and a mean for the pre-adjusted computation window, including to:
access or receive l data elements not including the added data element from each side of the adjusted computation window respectively without accessing or receiving all data elements in the adjusted computation window to allow the configured computing system to use less memory;
access the one or more components of the autocorrelation at lag l other than a sum and a mean for the pre-adjusted computation window; and
add a contribution of the data element added to the pre-adjusted computation window to each of the one or more accessed components based on the added data element and/or the l data elements from each side of the adjusted computation window without using all data elements in the adjusted computation window thereby resulting in faster computation time; and
generate, by the configured computing system, the autocorrelation at lag l for the adjusted computation window based on one or more of the calculated components.

15. The computing device program product of claim 14, wherein the computing-device-executable instructions that, when executed, cause the configured computing system to generate the autocorrelation at lag 1 comprise computing-device-executable instructions that, when executed, further cause the configured computing system to indirectly incrementally calculate, by the configured computing system, one or more components of the autocorrelation at lag 1 for the adjusted computation window, wherein indirectly incrementally calculating the one or more components includes individually calculating each respective one of the one or more components based on one or more components other than the respective one component.

16. The computing system program product of claim 14, wherein the computing-device-executable instructions that, when executed, further cause the configured computing system to access or receive a data element, to store the accessed or received data element, to adjust the pre-adjusted computation window and the computation window size counter, to incrementally calculate a sum or a mean or both for the adjusted computation window, to directly incrementally calculate the one or more components of an autocorrelation at lag 1, and to generate the autocorrelation at lag 1 for the adjusted computation window for each of multiple data elements to be accessed or received.

17. The computing system program product of claim 16, wherein the computing-device-executable instructions that, when executed, cause the configured computing system to generate the autocorrelation at lag 1 comprise computing-device-executable instructions that, when executed, cause the configured computing system to generate the autocorrelation at lag 1 for the adjusted computation window only when the autocorrelation is accessed.

18. The computing system program product of claim 17, wherein the computing-device-executable instructions that, when executed, cause the configured computing system to generate the autocorrelation at lag 1 comprise computing-device-executable instructions that, when executed, further cause the configured computing system to indirectly incrementally calculate one or more components of the autocorrelation at lag 1 for the adjusted computation window, wherein indirectly incrementally calculating the one or more components includes individually calculating each respective one of the one or more components based on one or more components other than the respective one component.

19. The computing system program product of claim 14, wherein the computing-device-executable instructions that, when executed, further cause the configured computing system to access or receive a data element, to store the accessed or received data element, to adjust the pre-adjusted computation window and the computation window size counter, to incrementally calculate a sum or a mean or both for the adjusted computation window, and to directly incrementally calculate the one or more components of an autocorrelation at lag 1 other than a sum and a mean for the adjusted computation window for each of multiple data elements to be accessed or received.

20. The computing system program product of claim 14, wherein the computing-device-executable instructions that, when executed, cause the configured computing system to store the accessed or received data element into the buffer comprise computing-device-executable instructions that, when executed, cause the configured computing system to store the accessed or received data element into a circular buffer.

* * * * *